United States Patent [19]
Yamaguchi et al.

[11] Patent Number: 5,813,620
[45] Date of Patent: Sep. 29, 1998

[54] SPINNING REEL FOR FISHING COMPRISING ROTATIONAL BALANCING WEIGHTS

[75] Inventors: Akira Yamaguchi; Kazuo Hirano; Masagi Saito, all of Tokyo, Japan

[73] Assignee: Daiwa Seiko, Inc., Tokyo, Japan

[21] Appl. No.: 698,272

[22] Filed: Aug. 15, 1996

Related U.S. Application Data

[63] Continuation of Ser. No. 115,708, Sep. 3, 1993, abandoned.

[30] Foreign Application Priority Data

| Sep. 4, 1992 | [JP] | Japan | 4-67950 U |
|---|---|---|---|
| Sep. 4, 1992 | [JP] | Japan | 4-67951 U |
| Dec. 29, 1992 | [JP] | Japan | 4-93399 U |
| Feb. 22, 1993 | [JP] | Japan | 5-056503 |
| Mar. 12, 1993 | [JP] | Japan | 5-077413 |
| Mar. 12, 1993 | [JP] | Japan | 5-077414 |
| May 10, 1993 | [JP] | Japan | 5-29642 U |

[51] Int. Cl.⁶ .................................................. A01K 89/01
[52] U.S. Cl. ........................................................ 242/232
[58] Field of Search ............................. 242/230, 231, 242/232, 233

[56] References Cited

U.S. PATENT DOCUMENTS

| 3,797,774 | 3/1974 | Dumbauld | 242/84.2 G |
|---|---|---|---|
| 3,967,791 | 7/1976 | Morishita . | |
| 4,147,313 | 4/1979 | Sazaki . | |
| 4,389,027 | 6/1983 | Sazaki et al. | 242/84.2 G |
| 4,848,695 | 7/1989 | Kaneko . | |
| 5,332,175 | 7/1994 | Furomoto | 242/231 |
| 5,350,129 | 9/1994 | Furomoto et al. | 242/231 |
| 5,379,957 | 1/1995 | Furomoto et al. | 242/230 |

FOREIGN PATENT DOCUMENTS

| 894625 | 12/1944 | France . |
|---|---|---|
| 897418 | 3/1945 | France . |
| 1113782 | 4/1956 | France . |
| 1213235 | 3/1960 | France . |
| 1238987 | 7/1960 | France . |
| 2195397 | 3/1974 | France . |
| 2 393 530 | 1/1979 | France . |
| 4226059 | 2/1993 | Germany . |
| 52-80887 | 6/1977 | Japan . |
| 53-33033 | 8/1978 | Japan . |
| 1-59063 | 4/1989 | Japan . |
| 3-74260 | 7/1991 | Japan . |
| 4-9564 | 1/1992 | Japan . |
| 4-127167 | 11/1992 | Japan . |
| 756630 | 9/1956 | United Kingdom . |
| 2257880 | 1/1993 | United Kingdom . |
| 2259435 | 3/1993 | United Kingdom . |
| 2260250 | 4/1993 | United Kingdom . |

OTHER PUBLICATIONS

Color Photograph of Daiwa p. 1650 BL—no date available.
Color Photograph of Shimano AX 200—no date available.
Color Photograph of Shimano Magnumlite GT–X 2250 SQ—no date available.
Color Photograph of Daiwa Super Tournament EX800i—no date available.
Color Photograph of Ryobi SB–1—no date available.
Color Photograph of Shimano MLX 300—no date available.

(List continued on next page.)

*Primary Examiner*—Katherine Matecki
*Attorney, Agent, or Firm*—Longacre & White

[57] ABSTRACT

A balancer is provided in the outer circumferential portion of a rotor of a spinning reel at the rear end of the rotor and located at the side of a bail in the fishline winding position thereof so that the center of gravity of the reel is located under a reel leg to facilitate the manipulation of the reel, and the rotative balance of the rotor is improved to stably and smoothly wind a fishline on the reel. The axis of the pivotally coupled portion of a bail support member, which is pivotally coupled to a bail support arm, is off set from the axis of the rotor toward the side of the bail in the fishline unwinding position to reduce the weight of the balancer.

45 Claims, 20 Drawing Sheets

OTHER PUBLICATIONS

Color Photograph of Shimano SS–Light Bass One—no date available.
Color Photograph of Shimano Magnumlite GT–X 2300 SM—no date available.
Color Photograph of Shimano Magnumlite GT–X 2250 SM—no date available.
Color Photograph of Ryobi Powerful AX 123—no date available.
Color Photograph of Daiwa PS 1305—no date available.
Color Photograph of Daiwa TD 1355 H—no date available.
Color Photograph of Daiwa Tournament EX750—no date available.
Color Photograph of Daiwa TD 1300 i—no date available.
Color Photograph of Shimano Magnumlite GT–X 2100 SM—no date available.
Color Photograph of Ryobi CX–1—no date available.
Color Photograph of Shimano GT–X 5250 SQ—no date available.
Color Photograph of Ryobi Ryobimax 3000—no date available.
Color Photograph of Ryobi Carbostar 1000—no date available.
Color Photograph of Daiwa Norman DX No. 2—no date available.
Color Photograph of Ryobi Catcher IMN—no date available.
Color Photograph of Daiwa ASA 1655—no date available.
Color Photograph of Daiwa Auto 1657 DM—no date available.
Color Photograph of Ryobi RX 2000 DX—no date available.
Color Photograph of Ryobi New Powerful Auto—no date available.
Color Photograph of Daiwa Ace No, 1—no date available.
Color Photograph of Daiwa Autocast ST 700 RD—no date available.
Color Photograph of Shimano Fast Cast X–25—no date available.
Color Photograph of Ryobi Powerful Auto—no date available.
Color Photograph of Daiwa Graphite G 1655 T—no date available.
Color Photograph of Ryobi GX 100—no date available.
Color Photograph of Shimano Fast Cast X–15—no date available.
Color Photograph of Daiwa Carbo Line SS900 RDA—no date available.
Color Photograph of Shimano Magnumlite GT–X 1300 Plus—no date available.
Color Photograph of Sears 440—no date available.
Color Photograph of Ryobi SX–1—no date available.
Color Photograph of Shimano MLX 200—no date available.
Color Photograph of Daiwa No, 7350 RL DX—no date available.
Sears model 440; sketch and photographs.
Mitchell model 440A; sketch and photographs.
Daiwa Auto 1657DM; sketch and photographs.
Daiwa TD–1355H; sketch and photographs.
Rumer 101; sketch and photographs.
Daiwa AutoCast ST–700RD; sketch and photographs.
Shimano GT–X1300; sketch and photographs.
Ryobi AX–123; sketch and photographs.
DAM QuickSuper; sketch and photographs.
Shimano GX–400; sketch and photographs.
Daiwa Custom S–270R; sketch and photographs.

SPINNING REEL FOR FISHING COMPRISING ROTATIONAL BALANCING WEIGHTS

This is a continuation of application Ser. No. 08/115,708, filed Sep. 3, 1993, which was abandoned upon the filing hereof.

BACKGROUND OF THE INVENTION

The present invention relates to a rotor incorporated in a spinning reel for fishing, and in particular to an arrangement for counter balancing the rotor with respect to its rotation.

In a conventional spinning reel for fishing, a semicircular bail is supported with bail support members such as levers and holders on the tips of bail support arms formed on a rotor and located opposite each other across the axis of the rotor. The bail together with the bail support members can pivot on the support arms so as to be inverted into either of a fishline winding position and a fishline unwinding position. However, since the bail and the bail support members are not shaped symmetrically right and left, the rotative balance of the rotor is deteriorated.

To solve the problem, a balancer is attached to a rotor opposite a bail in the fishline winding position thereof across the axis of the rotor, as disclosed in the Japanese Utility Model Application (OPI) No. 80887/77 (the term "OPI" as used herein means an "unexamined published application"). To otherwise solve the problem, a balancer is provided on the tip of one of the support arms so as to be movable in parallel with a spool shaft, as disclosed in the Japanese Utility Model Application No. 33033/78.

Further, the following solutions are also known in the art the axis of the pivotally coupled portion of a bail, which is pivotally coupled to a bail support arm, is located off the axis of a rotor opposite a bail in the fishline winding position thereof and a pair of support members located on a rotor opposite each other across the axis of the rotor are made of different materials having respective specific gravity.

However, recent tendency is that the center of gravity of the assembly of a rotor and other reel components thereon is more biased or moved forward since a ball bearing is used for a fishline guide roller at the tip of the bail support member to improve the efficiency of winding of a fishline, as disclosed in the Japanese Utility Model Application (OPI) No. 59063/89, or a fishline tangling preventive member is provided on a bail support member, as disclosed in the Japanese Utility Model Application (OPI) No. 74260/91 or No. 9564/92.

To yet otherwise solve the problem, a balancer is provided in the rear end of the outer circumferential portion of the rotor at the rearward portion from the support arm not only to avoid the forward biasing of the center of gravity of the entire assembly of the rotor and other reel components thereon but also to prevent the couple from being generated thereon at the time of the rotation of the rotor, as disclosed in the Japanese Utility Model Application (OPI) No. 127167/92.

However, since the balancer-housing projects from the outer circumferential portion of the rotor, the reel having such rotor suffers from the following problems:

(1) If such a balancer is provided in the outer circumferential portion of the rotor of a spinning reel in which the rotor is rapidly rotated by the turning of a handle to wind a fishline on a spool, the outward projections caused by the balancer requires a user to pay more attention to the projections to secure safety in winding the fishline on the spool. For that reason, the manipulating property of the reel is deteriorated.

(2) Since the balancer-housing provides a partially projecting outer configuration the reel is not compact and is low in portability and likely to undergo scratch flaw or damage in the projecting portion if the reel is dropped or collides against something.

(3) Since the spinning reel operates so that the fishline is wound on the reciprocating spool by rotating the rotor having a fishline guide, the fishline tends to be twisted through the repetition of winding and unwinding thereof so that the fishline is likely to tangle on the projecting portion on the outer circumference of the rotor at the time of the winding or unwinding of the fishline so as to hinder smooth fishing.

(4) Since the outer circumferential portion partially projects from the body of the rotor, the appearance of the rotor is not good.

(5) Since the balancer is merely added to the rotor, the entire weight of the rotor is increased to make it difficult to use the rotor as a component of a fishing reel.

SUMMARY OF THE INVENTION

The present invention was made in order to solve the above-mentioned problems. Accordingly, it is an object of the invention to provide a spinning reel which is for fishing and which has a specific counter balancing arrangement for efficiently improving the rotative balance of a rotor while minimizing the increase of the entire weight of the rotor and securing the safety purpose.

A spinning reel, which is for fishing and is provided in accordance with the present invention, includes a bail which can be inverted into either of a fishline winding position and a fishline unwinding position; bail support members supporting the bail thereon, one of which has a fishline guide; a rotor having a pair of support arms located opposite each other across the axis of the rotor for supporting respective bail support members to permit the bail support members to pivot around a rotation axis. The reel is characterized in that the rotation axis is off-set from the axis of the rotor in a direction opposite to the bail positioned in the fishline winding position, and a balancer means for improving the rotative balance of the rotor is provided at least in the arm supporting the bail support member having the fishline guide so that the balancer means is located at a side toward the bail positioned in the fishline winding position with respect to the rotation axis.

Since the center of gravity of the bail of the spinning reel is located forwardly of the rotor, the balancer means needs to be provided behind the bail to virtually shift the center of gravity thereof rearward to correct the longitudinal imbalance of the assembly of the rotor and other components thereon or prevent the generation of the couple coupling forces thereon. Further, since the weight of the bail support member having the fishline guide is larger than that of the other bail support member and the center of gravity of the former bail support member is located forwardly of the rotor, the balancer means needs to be provided behind the former bail support member to virtually shift the center of gravity rearward to correct the longitudinal imbalance of the assembly.

Thus, a balancer means consisting of two balancers is necessary, one of which is provided in an area defined by the bail positioned in the fishline winding position and the other of which is provided in an area defined by the bail support member having the fishline guide in a frontal view of the rotor. However, these two balancers can be replaced with a mixing composite balancer located at a certain position within the overlapped portion of the a fore-mentioned areas. In that case, if the certain position defined within or near the bail-side portion of the support arm supporting the bail support member having the fishline guide, the composite balancer can be accommodated within the support arm to improve the rotative balance of the rotor as much as possible while making the assembly of the rotor and other reel components thereon compact. If the certain position is located relatively far from the bail-side portion of the support arm, the composite balancer is further divided so as to be accommodated in both the support arms to improve the rotative balance of the rotor as much as possible.

The off-set arrangement of the rotation axis of the bail support members relative to the rotor axis in coperation with the above-noted balancer arrangement can prevent both the in balance of the centrifugal forces and the generation of the couple forces when the rotor is rotated, while minimizing the increase of the weight of the assembly of the rotor and the other reel components thereon.

The imbalance of centrifugal forces, which results from the weight difference between the bail support members can be minimized, without diminishing the compactness of the assembly, if the bail support members are made of different materials having respective specific gravity or a balancer is provided in the support arm supporting the bail supporting member having no fishline guide.

The present invention further provides a spinning reel, in which a bail is supported with a bail support member on a support arm on the rotor so that the bail can be inverted into either of a fishline winding position and a fishline unwinding position. The reel is characterized in that a balancer for improving the rotative balance of the rotor is provided in the rear portion of the rotor at the side of the bail in the fishline winding position. Preferably, the balancer does not project from the rotor outward in the radial direction thereof. The rotation axis around which the bail support members, pivot on the support arms, may be positioned off-set away from the axis of the rotor toward the side of the bail positioned in the fishline unwinding position in order to reduce the weight of the balancer to diminish the weight of the assembly of the rotor and the balancer.

In the spinning reel provided in accordance with the present invention, the balancer is fitted in the outer circumferential rear portion of the rotor at the side of the bail in the fishline winding position so that the center of gravity of the entire reel is located under the hanger of the reel, and the longitudinal balance of the rotor with respect to its rotation is improved to smoothly and easily manipulate the reel to wind a fishline thereon. Since the balancer does not project from the rotor, the balancer does not hinder fishing and is not inconvenient to carry or store the reel. If the pivot axis of the bail support member relative to the support arm is located off the axis of the rotor and toward the side of the bail in the fishline unwinding position, the rotative balance of the rotor can be not only improved but also the weight of the balancer can be reduced to diminish the weight of the assembly of the rotor and the balancer.

The present invention further provides a spinning reel which is for fishing and in which bail support members for supporting a bail are pivotally coupled to support arms integrally formed on a rotor and located opposite to each other across the axis of the rotor, and are located at the tips of the arms. The width of the support arm coupled with the bail support member having the fishline guide is increased from the tip of the arm toward the butt thereof, and a balancer is provided within a space of the arm defined by the increased width at the butt of the arm. The width of the support arm may be stepwise increased from the tip thereof toward the butt thereof. The width the bail support arm may be increased from the tip thereof toward the butt thereof to cause one side edge of the arm to extend nearly in parallel with the axis of the rotor but to cause the other side edge of the arm to extend obliquely to the former side edge. It is preferable to locate the balancer at the side defined by the bail positioned in the fishline winding position thereof. The pivot axis of the bail support members, relative to the support arms, may be off-set away from the axis of the rotor toward the side defined by the bail positioned in the fishline unwinding position thereof to make it possible to not only improve the longitudinal balance of the rotor with respect to its rotation but also reduce the weight of the additional balancer for improving the rotative balance.

Since the width of the bail support arm of the spinning reel provided in accordance with the present invention is increased from the tip of the arm toward the butt thereof and the balancer is provided in the arm at the butt thereof, the weight of the rotor and the other reel components thereon is prevented from being biased toward the tip of the arm due to the weight of the bail and the bail support member. The rotative balance of the rotor is thus stabilized to smoothly and easily wind a fishline on the reel. If the pivot axis of the bail support members relative to the support arms are off-set away from the axis of the rotor toward the side defined by the bail in the fishline unwinding position thereof, the rotative balance of the rotor can be more stabilized.

The present invention further provides a spinning reel which is for fishing and which includes a bail which can be inverted into either of a fishline winding position and a fishline unwinding position; a recess provided in a support arm, to the front portion of which a bail support member for supporting the bail is coupled; an outer plate closing the recess; and mechanical means provided in the recess in order to invert the bail into either of the positions. The reel is characterized in that an inner plate is provided in the recess along the outer plate; the mechanical means are disposed on the inner plate; and plate-like balancer for improving the rotative balance of a rotor is provided on the inner plate opposite the mechanical means. The reel may have a plate-like balancer provided in the recess along the mechanical means which is for improving the rotative balance of a rotor and also serves as inner plate.

In the spinning reel provided in accordance with the present device, the inner plate divides the space of the recess into layers piled together in the direction of thickness of the recess, the mechanical means for inverting the bail into either of the positions is disposed in one of the inner and outer layers on the inner plate, and the plate-like balancer is disposed in the other one of the outer and inner layers on the inner plate. For that reason, the support arms can be made compact. The plate-like balancer may be used as the inner plate so that additional inner plate can be dispensed with.

The present invention further provides a spinning reel for fishing, comprising: a rotor defining a first axis around which the rotor is rotatable; a pair of support arms, each projecting from the rotor; and a pair of bail support members supporting a bail and pivotably coupled to the support arms, respectively, so that the bail is inverted into either of a fishline winding position and a fishline unwinding position, the rotor further defining with respect to the first axis a fishing winding side to which the bail in the fishline winding position belongs and a fishline unwinding side to which the bail in the fishline unwinding position belongs; and wherein each of the support arms is divided into a first part belonging to the fishline winding side and a second part belonging to the fishline unwinding side, the weight of the second part being greater than the weight of the first part so as to counterbalance the weight of the bail located in the fishline winding position. Preferably, each of the support arms obliquely extends relative to the first axis, and the support arms pivot relative to the support arms about a second axis which is off-set from the first axis in a direction away form the fishing winding side toward the fishing unwinding side.

Owing to the weight distribution of each support arm, which may be attained by the inclined configuration thereof, it is possible to counterbalance the weight of the bail located in the fishline winding position and to correct the circumferential weight distribution of the rotor to improve rotative balance. Further, it is also possible to correct the center of the gravity of the rotor rearwardly to prevent generation of the couple of forces during the rotation of the rotor. The off-set arrangement of the second axis, i.e. the pivot axis of the bail support member relative to the support arm, functions in cooperation with the inclined support arm and makes it easier to improve the circumferential and longitudinal weight distributions of the rotor. The off-set arrangement of the second axis and the weight distribution of the support arms can dispense with an additional balancer in order to provide the improved rotative balance the of the rotor.

DETAILED DESCRIPTION OF THE PREFERRED EMBODIMENTS

Preferred embodiments of the present invention are hereafter described in detail with reference to the drawings attached hereto.

Figure 1:
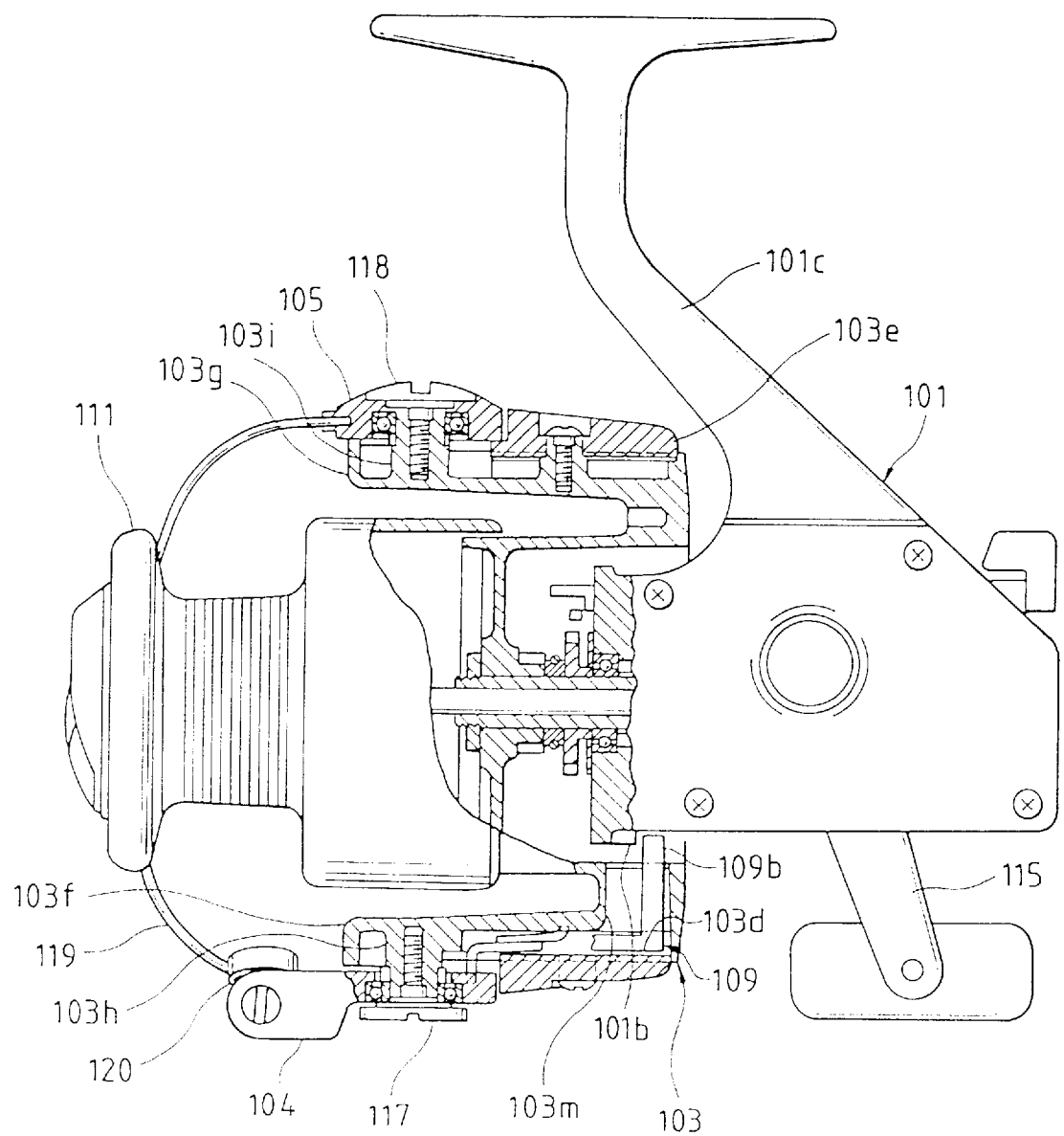
FIG. 1 is a cutaway side view of a spinning reel which is for fishing and is an embodiment of the present invention.
Figure 2:
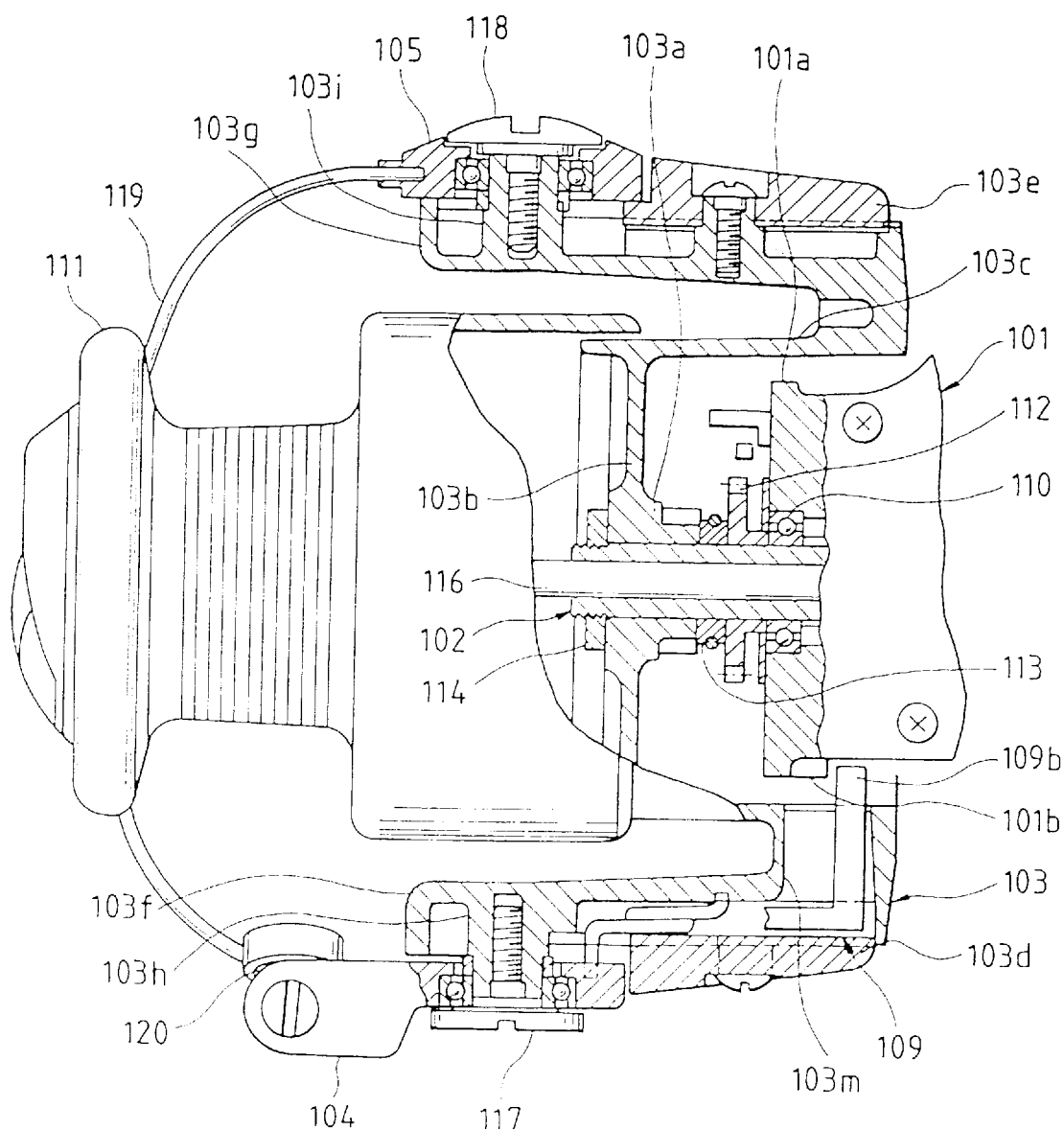
FIG. 2 is an enlarged cutaway side view of a major part of the reel.

FIGS. 1 and 2 show a spinning reel which is for fishing and is an embodiment of the invention.

A bearing 110 is mounted on a drive quill 102 in a front portion 101a of the casing 101 so that the quill is rotatably supported with the bearing. A ratchet wheel 112 and a collar 113 are mounted on the quill 102 in front of the bearing 110. An inner cylindrical portion 103a of a rotor 103 is fitted on the quill 102 in front of the collar 113 so that the rotor is not rotatable relative to the quill. A nut 114 is theadingly engaged with the quill 102 at the front end thereof, and tightened on the inner cylindrical portion 103a of the rotor 103. A pinion (not shown in the drawings) is mounted on the quill 102 and engaged with a drive gear (not shown) so that the quill can be rotated through the pinion and the gear by turning the handle 115, to rotate the rotor 103. A spool shaft 116 is fitted in the quill 102, and projects therefrom. A spool 111 is supported on the spool shaft 116 at the front end thereof so that the spool can be reciprocated backward and forward together with the spool shaft in conjunction with the rotation of the rotor 103.

The rotor 103 includes, a front wall 103b, an outer cylindrical portion 103c, and a pair of support arms 103f and 103g extending forward from the rear part of the outer cylindrical portion. The bail support member 104, which has a fishline guide roller 120, is supported with the screw 117 on the boss 103h of the support arm 103f so that the member can be pivotally inverted into either of a fishline winding position shown by full lines in FIG. 3, and a fishline unwinding position shown by two-dot chain lines therein. The other bail support member 105 is supported with the other screw 118 on the boss 103i of the other support arm 103g so that the member can be pivotally inverted into either of a fishline winding position shown by full lines in FIG. 4, and a fishline unwinding position shown by two-dot chain lines therein. The bail 119 is coupled at one end thereof to the bail support member 104 in the vicinity of the fishline guide roller 120 and at the other end thereof to the other bail support member 105.

The axes 103h' and 103i' of the bosses 103h and 103i on which the bail support members 4 and 5 can respectively pivot relative to the support arms 103f and 103g are off-set away from the axis LA of the rotor 103 toward a side opposite from the bail 119 positioned in the fishline unwinding position thereof so that the distance between the axis of the rotor and each of the axes of the bosses is 1 to 7 mm. Besides, the rotor 103 is shaped or arranged in consideration of the biasing weight of the semicircular bail 119 and that of the balancers 107 and 108 in order to improve the radial rotative balance of the rotor through both the disposition of the axes 103h' and 103i' of the bosses 103h and 103i and the shaping of the rotor so that the weight of the assembly of the rotor and the balancers is smaller than in the case that the balancers are only attached to the rotor.

Figure 3:
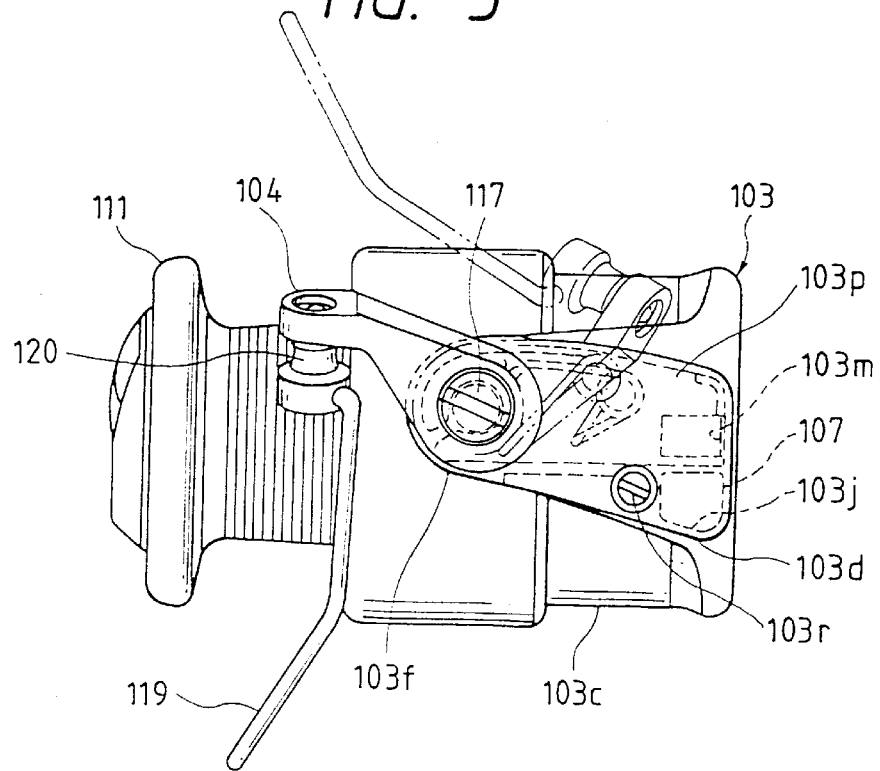
FIG. 3 is a side view of the reel seen on the side of a fishline guide roller.
Figure 4:
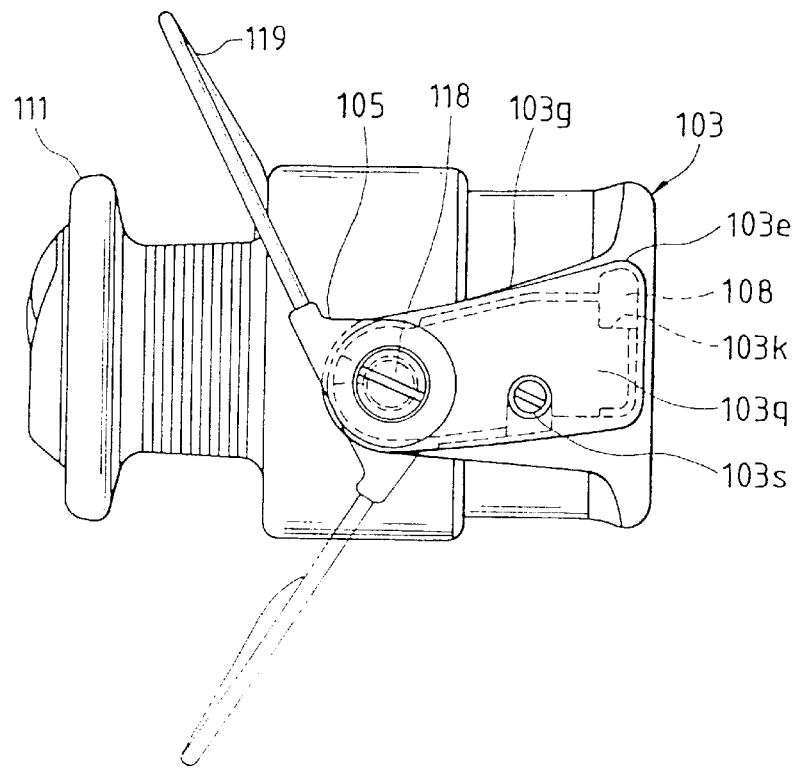
FIG. 4 is a side view of the reel seen opposite the side.

The support arms 103f and 103g extend from the butt portions 103d and 103e thereof to the tip portions thereof so as to be oriented from the side of the fishline winding position of the bail 119 toward the side of the fishline unwinding position thereof, as shown in FIGS. 3 and 4. That is, the tip portion of each support arm 103f, 103g is shifted away from the side defined by the bail 119 in the fishline winding position relative to the butt portions 103d, 103e thereof. However, the arms 103f and 103g are not confined thereto but may extend substantially along the axis LA of the rotor 103 so that only the butt portions of the arms are located nearer the side of the fishline winding position of the bail 119 than the other portions thereof, or so that only the central portions and butt portions of the arms located nearer the side of the fishline winding position of the bail than the tip portions thereof.

The sides of the arms 103f and 103g, which face the bail 119 in the fishline winding position, have recesses 103j and 103k in the butt portions 103d and 103e of the arms. The balancers 107 and 108 are provided in the recesses 103j and 103k. The butt portion 103d has a through hole 103m extending through the portion toward the axis of the rotor 103 as best shown in FIG. 2.

Figure 7:
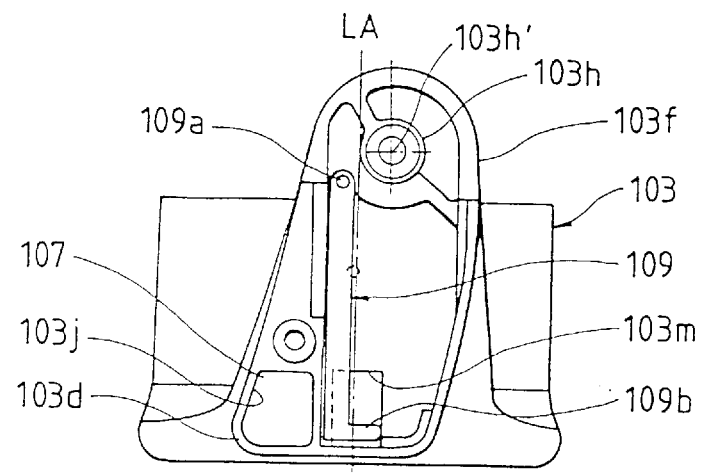
FIG. 7 is a side view of the rotor to chiefly show the support portion thereof for a bail support member shown in FIG. 3.

A L-shaped lever 109 for inverting the bail support members 104 and 105 and the bail 119 from their fishline unwinding positions shown by two-dot chain lines in FIGS. 3 and 4, into their fishline winding positions shown by full lines therein is provided in the support arm 103f, as shown in FIGS. 1, 2 and 7. The projection 109a of the lever 109, which is located at one end of the lever, is fitted in the hole of the bail support member 104, which is not shown in the drawings. The other end 109b of the lever 109 is fitted in the through hole 103m of the arm 103f near the cam portion 101b of the casing 101, as shown in FIGS. 1 and 2, so that the end can be put into contact with the cam portion. Covers 103p and 103q are respectively secured to the support arms 103f and 103g by screws 103r and 103s so that the covers cover the outer surfaces of the arms and the lever 109 to protect them.

When a fishhook and a fishline are cast away, the fishline is unwound from the spool 111 as the bail support members 104 and 105 are in their fishline unwinding positions shown by the two-dot chain lines in FIGS. 3 and 4. When the rotor 103 is thereafter rotated by turning the handle 115, the end 109b of the lever 109 is put into contact with the cam portion 101b of the casing 101 so that the lever is moved rearward to invert the bail support member 104 to put both the bail support members 104 and 105 and the bail 119 into their fishline winding positions. At that time, the fishline is swung by the bail 119 so that the fishline is put onto the fishline guide roller 120. When the rotor 103 is then rotated by turning the handle 115, the fishline is wound on the spool 111.

Figure 8:
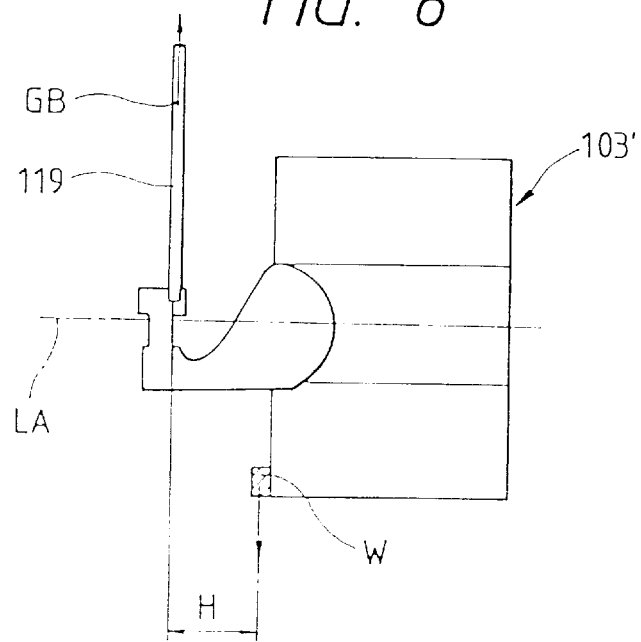
FIG. 8 is a view to illustrate the generation of a couple on a rotor.

The reasons for determining the above-described constitution and operation of the spinning reel are described from now on. The centrifugal forces of both the halves of a rotor 103', which are divided from each other to the sides of the fishline winding position and fishline unwinding position of a bail 119 across the axis LA of the rotor, cannot be balanced to each other only by providing a balancer W on the outer cylindrical portion of the rotor opposite the bail to counteract the centrifugal force thereof, because a couple is generated on the rotor due to the distance H between the balancer and the center GB of gravity of the bail, as shown in FIG. 8. For the balancing, the center GB of gravity of the bail 119 needs to be shifted rearward. It was disclosed in the Japanese Utility Model Application (OPI) No. 127167/92 (the term "OPI" as used herein means an "unexamined published application") that for such a purpose, a balancer is provided in the rear portion of the cylindrical body of a rotor at the side of a bail. However, the rear portion of the cylindrical body of the rotor projects outward due to the providing of the balancer in the portion to deteriorate the appearance of the rotor, the weight of the assembly of the rotor and other components thereon is increased, and the rotor is not compacts so that the rotor is not appropriate for a reel.

According to the present invention, the form of the rotor 103 of the spinning reel which is the embodiment is designed to improve the rotative balance of the rotor as much as possible while minimizing the weight and size of the rotor.

Figure 9:
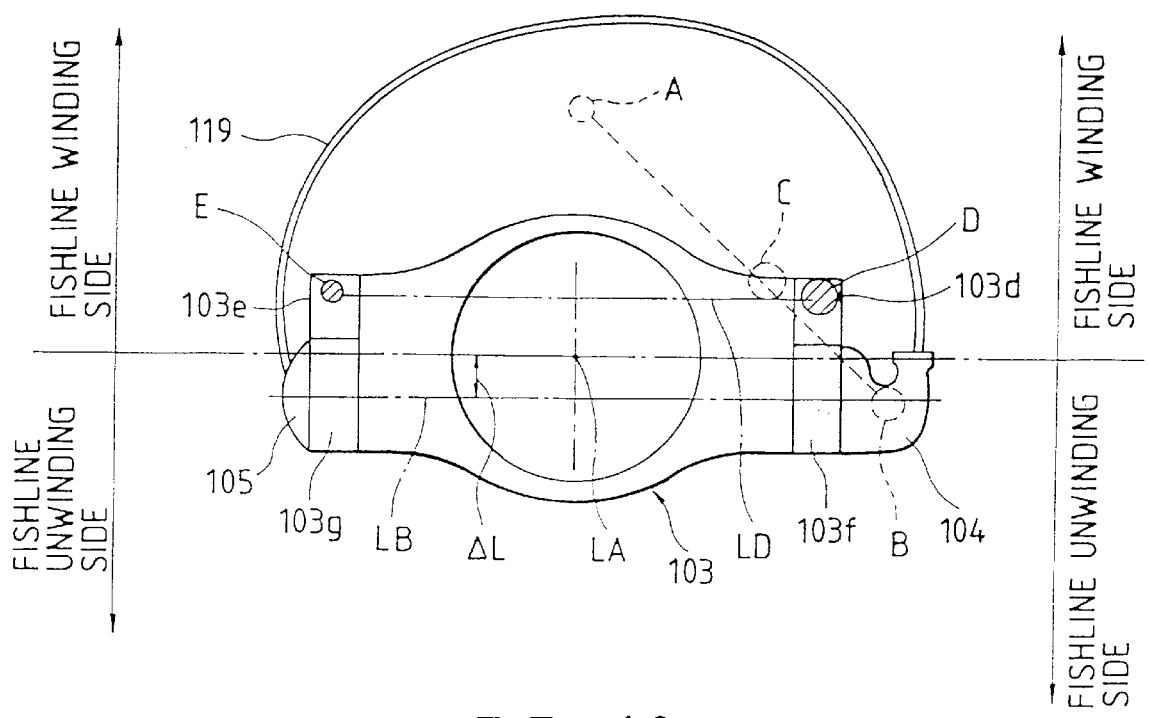
FIG. 9 is a view to illustrate anti-couple balancers.
Figure 10:
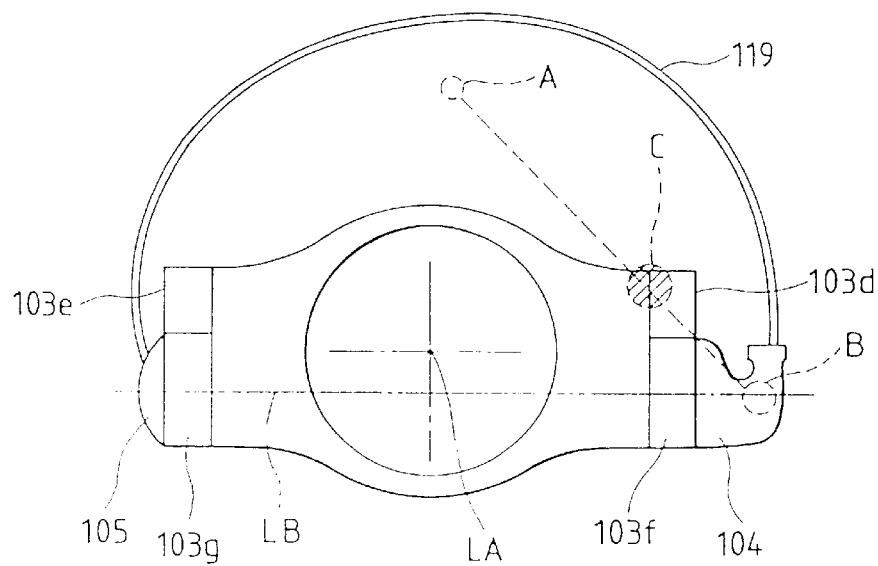
FIG. 10 is a view to illustrate other anti-couple balancers.

FIG. 9 is a front view of the rotor 103 to illustrate the principle of the present invention. The bail support members 104 and 105 are pivotally coupled to the support arms 103*f* and 103*g* of the rotor 103 at the front ends of the arms so that the axes of the pivotally coupled portions of the bail support members extend off the axis LA of the rotor in a direction opposite from the bail 119 in the fishline winding position. It is now supposed that a balancer A is provided on the rear portion of the rotor 103 to virtually shift the center of gravity of the bail 119 rearward. Since a couple is similarly generated on the rotor when a balancer is merely provided for counterbalancing the weight difference between the reel components attached to the support arms 103*f* and 103*g* with respect to the circumferential weight distribution, it is also supposed that a balancer B is provided on the rear portion of the rotor 103 behind the bail support member 104 attached to the support arm 103*f* to shift the center of gravity of the bail support members 104 and 105 rearward. The balancers A and B are located as posteriorly as possible in order to minimize the entire weight of the assembly of the rotor 103 and the other components thereon. The center of gravity of the assembly can thus be virtually shifted rearward by the balancers A and B of minimum weight. Therefore, the balancers A and B are located at or near the rear end of the rotor 103. The balancers A and B can be replaced with a resultant or composite balancer C. Although the resultant balancer C is not always on a straight line LD extending through the butt portions 103*d* and 103*e* of the support arms 103*f* and 103*g*, which portions are located off the axis LA and at the side of the bail 119 in the fishline winding position with regard to FIG. 9, it is supposed that the resultant balancer is on the straight line and divided into two balancers D and E in the butt portions in order to improve the rotative balance of the rotor 103 as much as possible while making the assembly of the rotor and the other components thereon compact, as shown in FIG. 9. The balancers D and E correspond to those 107 and 108 shown in FIGS. 3 and 4, respectively. If the balancers A and B are provided on the rotor 103 in front of the rear end thereof to locate the resultant balancer C nearer the axis LA of the rotor, the balancers D and E are not necessarily located in the butt portions of the support arms 103*f* and 103*g* but located slightly more anteriorly. Besides, the resultant balancer C can be located in the support arm 103*f* or near it, depending on the distribution of the weight of the rotor 103 and the other components thereon, as shown in FIG. 10. In that case, none of the divided balancers needs to be located in the other support arm 103*g*.

Figure 6A:
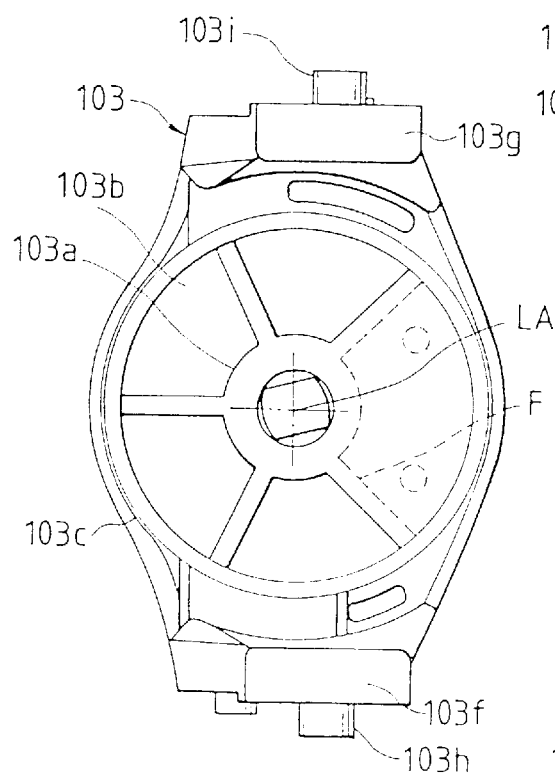
FIGS. 6A and 6B are front and longitudinally sectional view of the rotor, respectively.
Figure 6B:
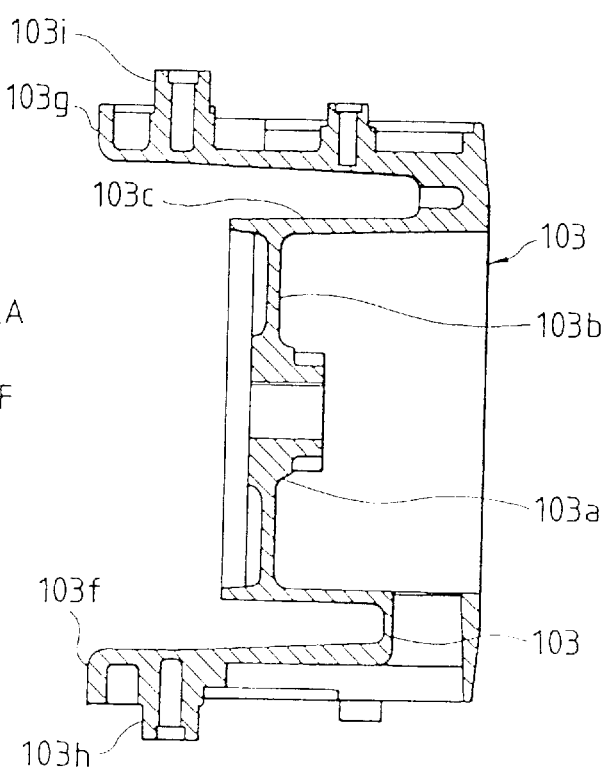

The balancer C or the balancers D and E are thus provided to prevent the generation of the couple. The support arms 103*f* and 103*g* are located off the axis LA of the rotor 103 opposite the bail 119 in the fishline winding position across the axis with regard to FIG. 9 so as to counteract the centrifugal forces of the balancer A and the bail, which act in the radial direction of the rotor from the axis thereof toward the central portion of the bail when the rotor is rotated. Since the bail 119 is inverted into either of its fishline winding position and fishline unwinding position, the distance between the inner curved surface of the bail and the outer circumferential surface of the spool 111 depends on the distance ΔL between the axis LA of the rotor 103 and each of the axes of the pivotally coupled positions of the bail support members 104 and 105. If the bail 119 in the fishline winding position is displaced toward the axis LA of the rotor 103 as to FIG. 9, the former distance is increased for the bail in the fishline unwinding position so that the fishline is less likely to come into contact with the reel at the time of the casting-away of the fishhook and the fishline, and they can therefore be smoothly cast away. However, with the displacement, the former distance is decreased for the bail in the fishline winding position so that the fishline is more likely to come into contact with the reel. Therefore, the latter distance ΔL is limited, and usually about 1 to 7 mm. For that reason, the centrifugal force of one half of the assembly of the rotor and the other components thereon, which includes the bail 119, and that of the other half of the assembly, which does not include the bail, cannot completely be balanced to each other only by setting the latter distance ΔL, in some case. In that case, an auxiliary balancer F may be provided on the outer or inner surface of the front wall 103*b* of the rotor 103 or the inside circumferential surface of the outer cylindrical portion 103*c* thereof, as shown by a dotted line in FIG. 6, to completely balance the centrifugal forces to each other. Even if the auxiliary balancer F is provided, it does not hinder the reel from being made compact.

To minimize the rotative imbalance of the rotor 103, which results from the centrifugal forces which are based on the weight of the balancer B and the weight difference between the components attached to the support arms 103*f* and 103*g*, a balancer may be provided in the arm 103*g*, or the bail support member 105 may be made of a higher-specific-gravity material such as zinc than the other bail support member 104. It is preferable to locate the balancer near the front end of the arm 103*g*. As far as the balancer is provided in the arm, it does not hinder the reel from being made compact. If the balancer is located near the front end of the arm 103*g*, the center of gravity of the bail support member 104 attached to the other arm 103*f* at the tip thereof does not need to be much lowered as to FIG. 9 or 10 and the weight of the balancer B can therefore be reduced to result in diminishing that of the reel.

Since the butt portions 3*d* and 3*e* of the support arms 103*f* and 103*g* are large in width, a bail urging means, a bail inversion means and the like can be provided in the butt portions. The rotative balance of the rotor can be improved without adversely affecting such means.

The support arms 103*f* and 103*g* are covered with the covers 103*p* and 103*q* so that the balancers 107 and 108 can be incorporated into the support arms in the same way as the bail inversion lever 109 and springs for urging the bail support members to invert them into either of the fishline winding position and the fishline unwinding position be incorporated into the support arms 103*f* and 103*g*. Further, the arms 103*f* and 103*g* and other components incorporated therein can be covered with the common covers 103*p* and 103*q*. Thus, it is possible to easily perform work and simplify the construction of the reel. Instead of the bail inversion lever 109, a return member may be provided on the hanger 101*c* of the reel over the casing 101 to cause the bail support member 104 to collide against the return member to invert the bail 119.

If each of the balancers 7 and 8 is made of a plurality of sheets, it is convenient because the weight and size of the balancer can be finely modulated by changing the number of the sheets. If the sheets differ from each other in specific gravity as sheets of lead, zinc, brass and the like, the freedom of the modulation is heightened. Besides, it is possible that the rotor itself is manufactured to be commonly used for many reels onto which fishline guide portions different from each other in constitution is selectively mounted and which have or do not have a bail inversion lever. The sheets can be manufactured by punching, not to require processing such as the deburring of a cast product and parting, and can thus be lowered in cost.

A spinning reel provided in accordance with the present invention includes a rotor which is rotated by turning a handle. The rotor is not only made smaller in size and weight and simpler in constitution, but also the rotative imbalance of the rotor, which is caused by the weight imbalance of reel components attached to the rotor, is minimized. The manipulating property of the reel can be enhanced.

Figure 11:
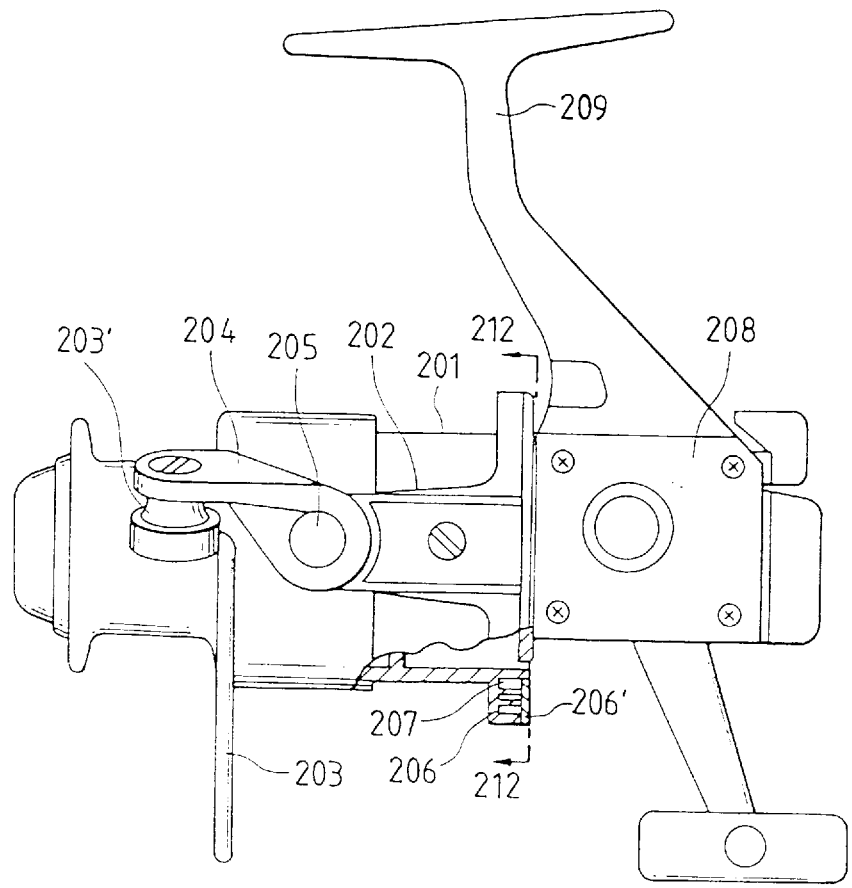
FIG. 11 is a cutaway side view of a spinning reel which is another embodiment of the present invention.
Figure 12:
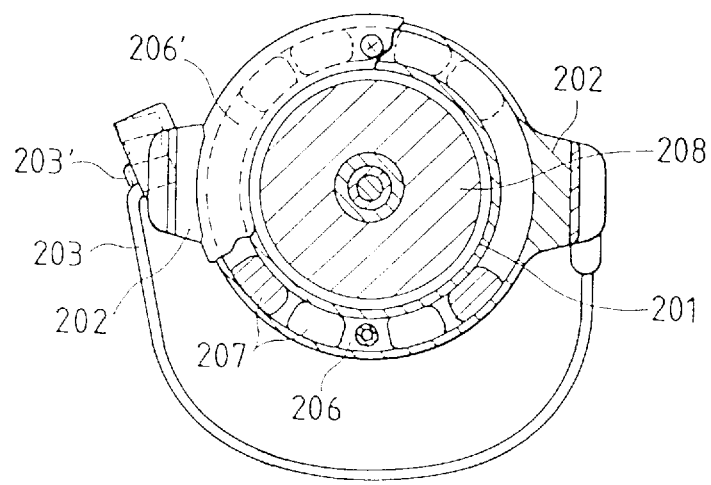
FIG. 12 is a cross-sectional view of the reel along line 12—12 shown in FIG. 11.
Figure 13:
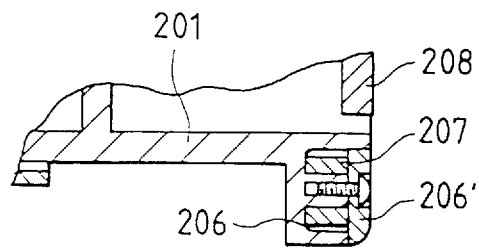
FIG. 13 is a longitudinally sectional view of a major part of the reel.

FIGS. 11, 12 and 13 show a spinning reel which is for fishing and is another embodiment of the invention.

A pair of support arms 202 are integrally formed on the rotor 201 at the rear end thereof and located opposite each other across the axis of the rotor, and extend forward from the rear end of the rotor. A bail support member 204 supporting a bail 203 and having a fishline guide portion 203' is pivotally coupled with the pin 205 to the tip of one of the bail support arms 202 so that the bail can be inverted into either of a fishline winding position and a fishline unwinding position.

The rotor 201 has a flagged housing portion 206 at the rear end of the rotor. The housing portion 206 circumscribes the rotor 201, and is located outside the cylindrical body of the rotor in the radial direction thereof. The housing portion 205 defines a plurality of recesses therein which are closed with a cover 206'. The balancer 207 is fitted in the housing portion 206 at the side of the bail 203 in the fishline winding position. The balancer 207 is accommodated and retained in the recess if the housing portion 206 by the cover 206 secured to the portion 206 with a screw. A hanger 209 extends upward from a casing 208 so that the upper portion of the hanger is located over the housing portion 206.

Figure 14:
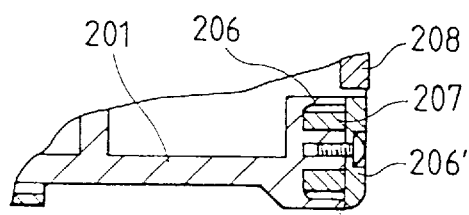
FIG. 14 is a longitudinally sectional view of a major part of a spinning reel which is a modification of the embodiment shown in FIG. 11.

FIG. 14 shows a major part of a spinning reel which is a modification of the embodiment. The difference of the reel from the embodiment is that the reel includes a rotor 201 having a housing portion 206 extending in the circumferential direction of the rotor and located both the inside and outside of the cylindrical body of the rotor in the radial direction thereof.

Figure 15:
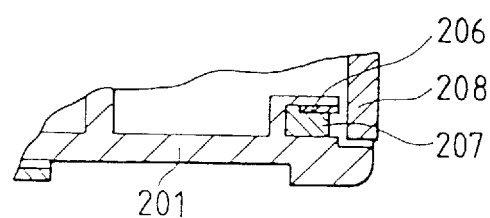
FIG. 15 is a longitudinally sectional view of a major part of a spinning reel which is another modification of the embodiment shown in FIG. 11.

FIG. 15 shows a major part of a spinning reel which is another modification of the embodiment. The difference of the reel from the embodiment is that the reel includes a rotor 201 having a housing portion 206 extending in the circumferential direction of the rotor and located inside the cylindrical body of the rotor in the radial direction thereof, and does not include a cover for the housing portion.

Figure 16:
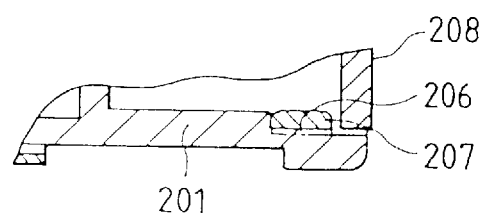
FIG. 16 is a longitudinally sectional view of a major part of a spinning reel which is yet another modification of the embodiment shown in FIG. 11.

FIG. 16 shows a major part of a spinning reel which is yet another modification of the embodiment. The difference of the reel from the embodiment is that the reel includes a rotor 201 having a housing portion 206 extending in the circumferential direction of the rotor and formed by cutting or grooving the cylindrical body of the rotor, and does not include a cover for the housing portion.

Figure 17:
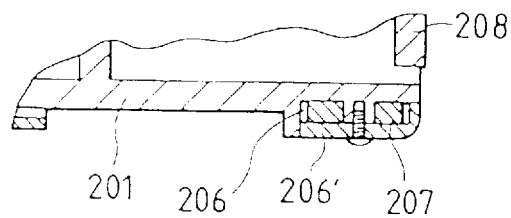
FIG. 17 is a longitudinally sectional view of a major part of a spinning reel which is yet another modification of the embodiment shown in FIG. 11.

FIG. 17 shows a major part of a spinning reel which is yet another modification of the embodiment. The difference of the reel from the embodiment is that the reel includes a rotor 201 having a housing portion 206 circumscribing the rotor and extending longer along the axis of the cylindrical body of the rotor but shorter in the radial direction of the body than the housing porion 206 of the embodiment.

Figure 18:
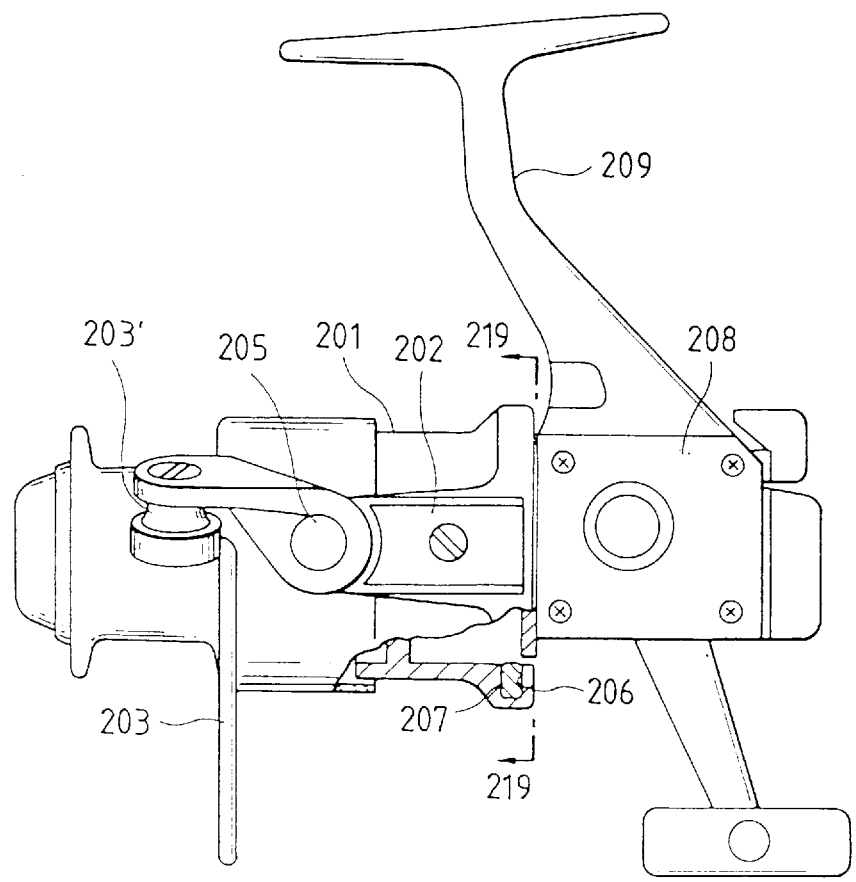
FIG. 18 is a longitudinally sectional view of a spinning reel which is yet another modification of the embodiment shown in FIG. 11.
Figure 19:
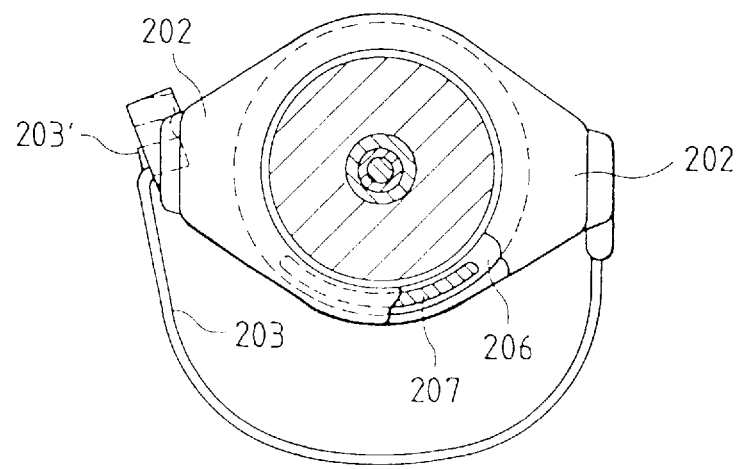
FIG. 19 is a cross-sectional view of the reel along line 19—19 shown in FIG. 18.

FIGS. 18 and 19 show a spinning reel which is yet another modification of the embodiment. The difference of the reel from the embodiment is that the reel includes a rotor 201 having a housing portion 206 circumscribing the rotor and located outside the inside circumferential surface of the cylindrical body of the rotor in the radial direction thereof, and an arc-shaped balancer 207 fitted in the housing portion.

The open end of the recess of the housing portion 206 is directed inwardly.

Figure 20:
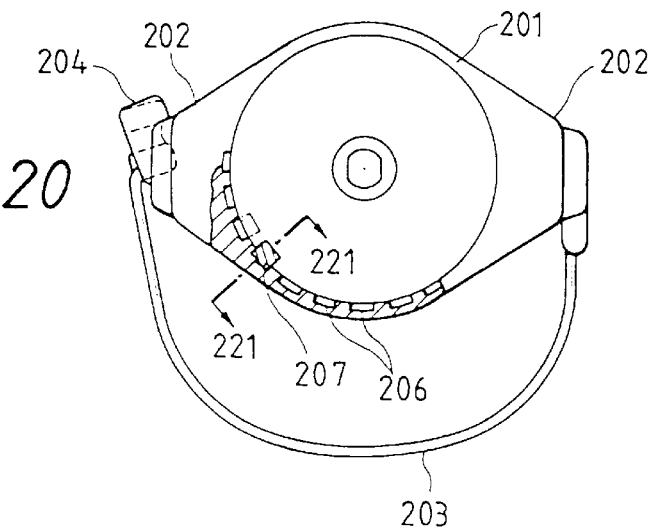
FIG. 20 is a cutaway view of a spinning reel which is yet another modification of the embodiment shown in FIG. 11.
Figure 21:
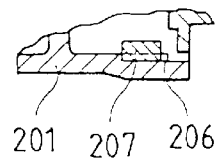
FIG. 21 is a longitudinally sectional view taken along line 21—21 of FIG. 20.

FIGS. 20 and 21 show a major part of a spinning reel which is yet another modification of the embodiment. The difference of the reel from the embodiment is that the reel includes a rotor 201 having a plurality of housing portions 206, and a balancer 207 fitted in optional one of the portions.

Figure 22:
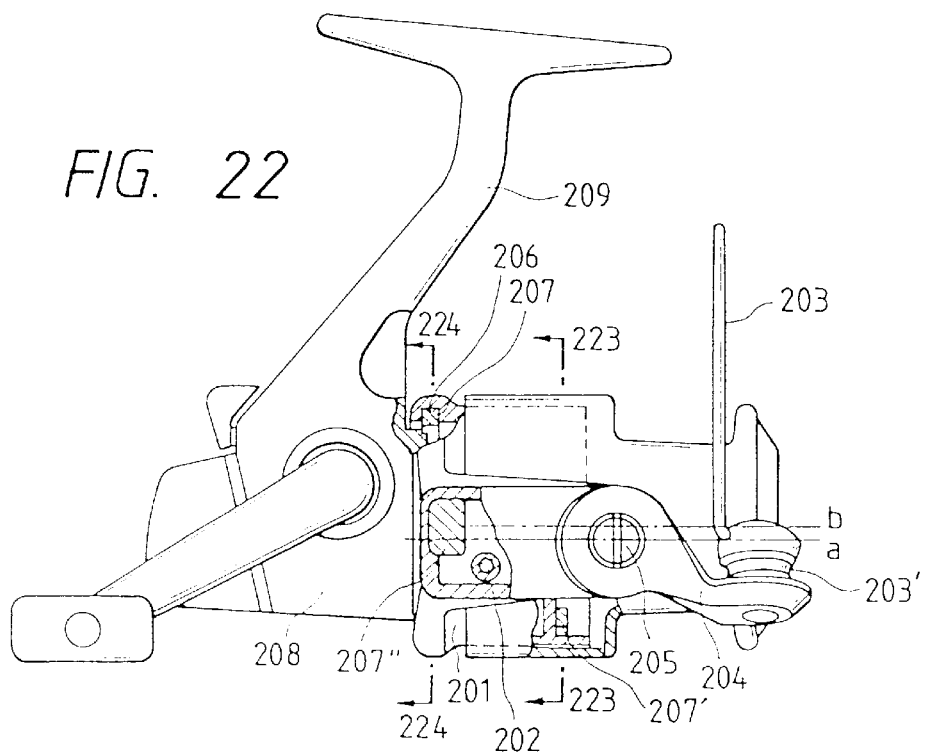
FIG. 22 is a cutaway side view of a spinning reel which is yet another embodiment of the invention.
Figure 23:
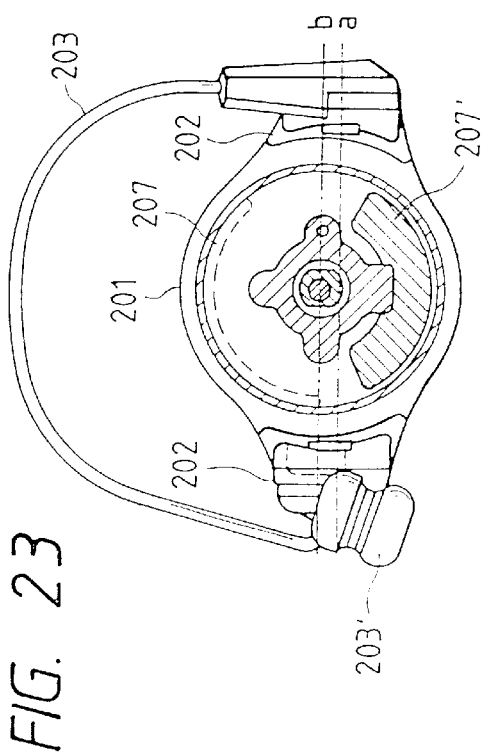
FIG. 23 is a cross-sectional view of the reel along line 23—23 shown in FIG. 22.
Figure 24:
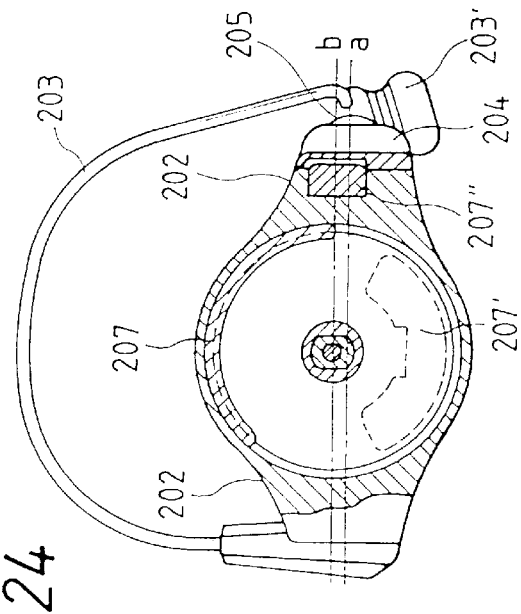
FIG. 24 is a cross-sectional view of the reel along line 24—24 shown in FIG. 22.

FIGS. 22, 23 and 24 show a spinning reel which is for fishing and is yet another of the embodiments. The axis a of the pivotally coupled portion of the bail support member 204, which is pivotally coupled to the support arm 202, is off-set away from the axis b of the rotor 201 toward the side of the bail 203 in the fishline unwinding position thereof in order to improve the rotative balance of the rotor through both the use of the balancer 207 and the disposition of the axis of the pivotally coupled portion of the member to reduce the weight of the balancer to diminish the entire weight of the assembly of the rotor and the balancer. The auxiliary balancer 207' is fitted on the front portion of the rotor 201. The other auxiliary balancer 207" is fitted in the support arm 202 rearwardly behind the bail support member 204.

A spinning reel which is for fishing and is provided in accordance with the present invention includes a balancer which is for improving the rotative balance of the rotor of the reel and is disposed in the circumferential rear portion of the rotor so that the balancer does not partially project from the rotor, the center of gravity of the entire reel is located under the upper portion of the hanger, and the rotation of the rotor is stabilized to smoothly and easily wind a fishline on the reel fastened to a fishing rod. Since the balancer does not project from the rotor, it is unlikely that the fishline tangles on the balancer in fishing, and the balancer is inconvenient to carry or store the reel and deteriorates the appearance thereof. The rotative balance of the rotor can thus be improved through a simple and compact construction.

The axis of the pivotally coupled portion of a bail support member, which is pivotally coupled to a bail support arm, may be disposed off the axis of the rotor and at the side of a bail in the fishline unwinding position thereof in order to improve the rotative balance of the rotor. Both the use of the balancer and the disposition of the axis of the pivotally coupled portion of the member can reduce the weight of the balancer to more enhance the manipulating property of the reel.

Figure 25:
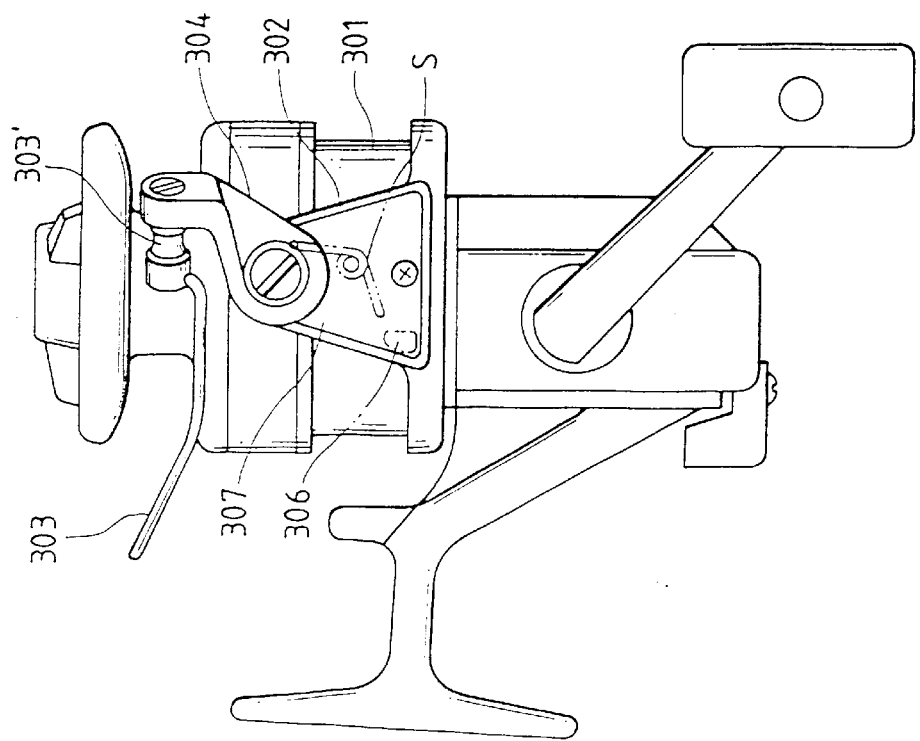
FIG. 25 is a side view of a spinning reel which is yet another embodiment of the present invention.
Figure 26:
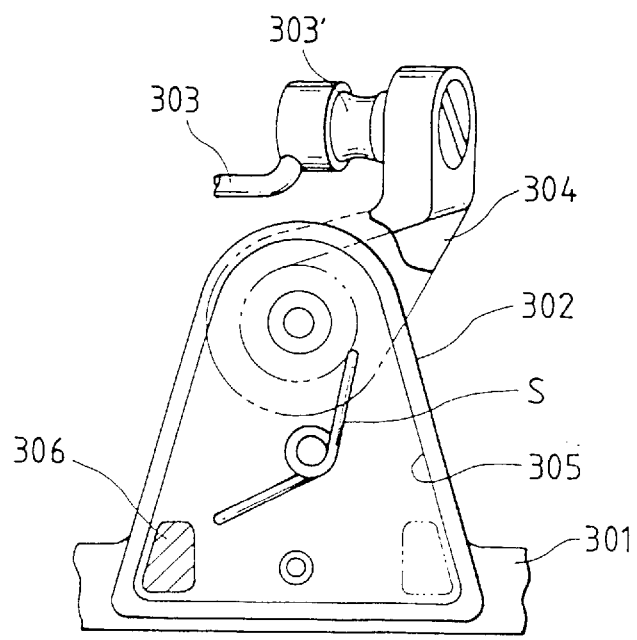
FIG. 26 is a side view of a major part of the reel in the state that a cover is removed.

FIGS. 25 and 26 show a spinning reel which is for fishing and is yet another embodiment of the invention. A pair of support arms 302 are integrally formed on the rear portion of the rotor 301, and located opposite each other across the axis of the rotor. The bail 303 is fixed at both the ends thereof to the bail support members 304 and 304'. The bail support members 304 and 304' are pivotally coupled to the support arms 302 at the tips thereof, respectively, so that the bail 303 can be inverted into either of a fishline winding position and a fishline unwinding position through the action of a spring S in a conventional manner. The support arm 302 fitted with the bail support member 304 having the fishline guide portion 303' is so shaped that the width there of is gradually increased from the tip of the arm to the butt thereof and a recess 305 is defined therein, in which a balancer 306 is secured at the butt of the arm so that the balancer is located at the side of the bail 303 in the fishline winding position. The cover 307 is removably attached to the support arm 302, and closes the recess 305.

Figure 27:
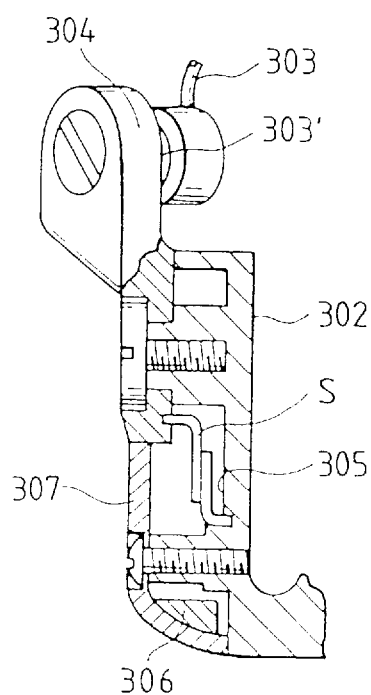
FIG. 27 is a longitudinally sectional view of a major part of a spinning reel which is a modification of the embodiment shown in FIG. 25.

FIG. 27 shows a major part of a spinning reel which is a modification of the embodiment. The difference of the reel from the embodiment is that a balancer 306 is secured to a cover 307.

Figure 28:
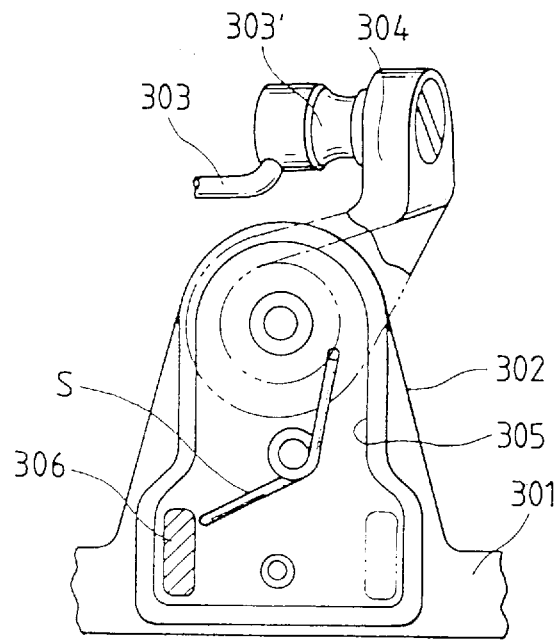
FIG. 28 is a side view of a major part of a spinning reel which is another modification of the embodiment shown in FIG. 25.

FIG. 28 shows a major part of a spinning reel which is another modification of the embodiment. The difference of the reel from the embodiment is that the width of a recess 305 is stepwise increased.

Figure 29:
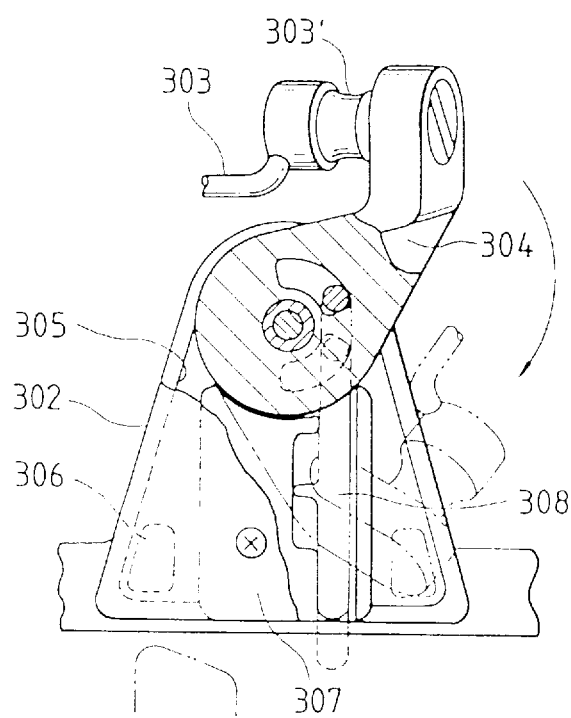
FIG. 29 is a cutaway side view of a spinning reel which is yet another modification of the embodiment shown in FIG. 25.

FIG. 29 shows a major part of a spinning reel which is yet another modification of the embodiment. The difference of the reel from the embodiment is that a bail inversion means 308 is provided in the recess 305 of a support arm 302.

Figure 30:
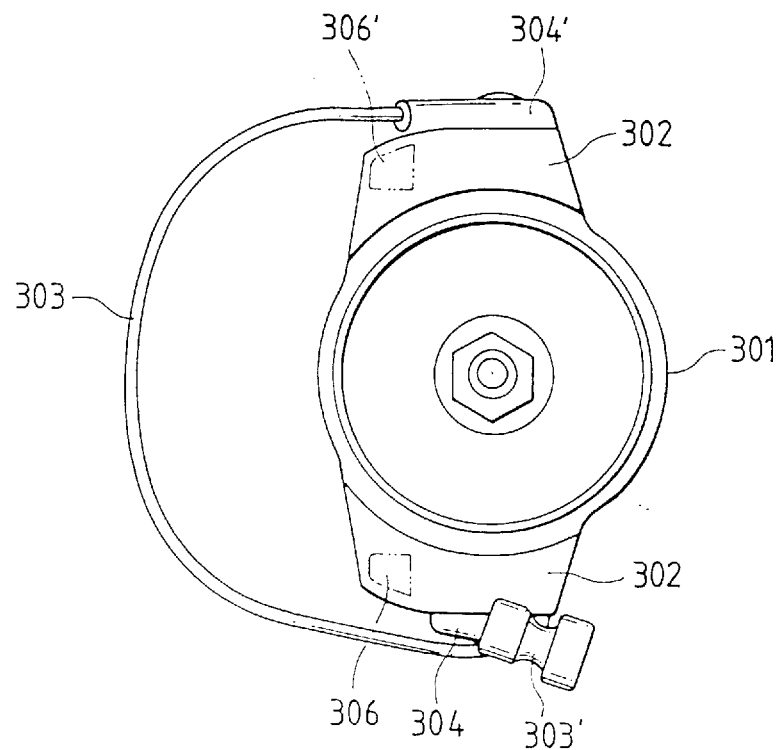
FIG. 30 is a front view of a major part of a spinning reel which is yet another modification of the embodiment shown in FIG. 25.
Figure 31:
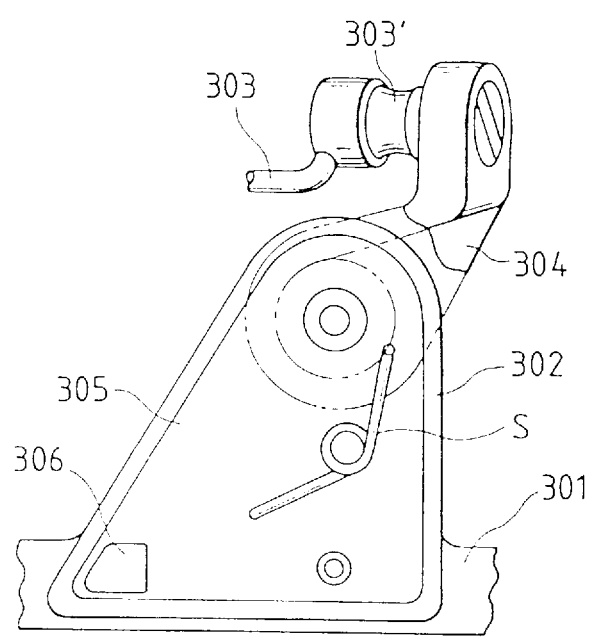
FIG. 31 is a side view of the part in the state that a cover is removed.
Figure 32:
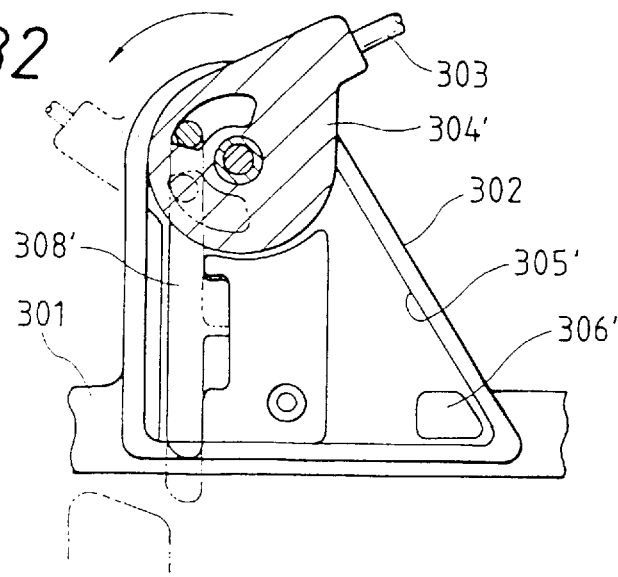
FIG. 32 is another side view of the part in the state that the cover is removed.

FIGS. 30, 31 and 32 show a major part of a spinning reel which is yet another modification of the embodiment. The difference of the reel from the embodiment is that the width of each of support arms 302 is increased from the tip thereof toward the butt thereof to cause one side edge of the arm to extend nearly in parallel with the axis of a rotor 301 but to cause the other side edge of the arm to extend obliquely to the former side edge toward the side of the bail in the fishline winding position. One of the arms has a recess 305 in which a balancer 306 is provided at the side of the bail in the fishline winding position thereof, and the other of the arms has a recess 305' in which another balancer 306' and an externally kicked means 308' for inverting the bail are provided so that the balancer is located at the side of the bail in the fishline winding position.

Figure 5:
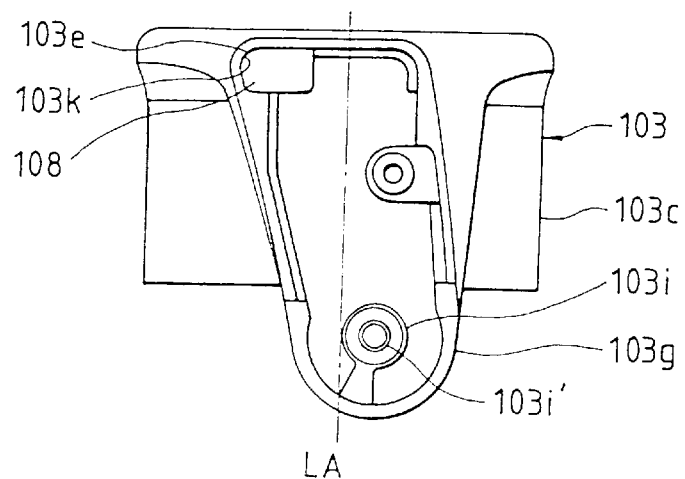
FIG. 5 is a side view of the rotor of the reel to chiefly show the support portion of the rotor for a bail support member shown in FIG. 4.

Although the balancer 306 is provided in the recess 305 of the support arm 302 at the side of the bail 303 in the fishline winding position in each of the above-mentioned spinning reels, another balancer equal to or larger or smaller in weight than the former may be provided in the recess at the side of the bail 303 in the fishline unwinding position as shown by dotted lines in FIGS. 2, 4 and 5. Instead of the these balancers, a balancer may be provided in the recess 305 along the entire butt edge thereof.

In the embodiment, since the support arm 302 fitted with the bail support member 304 fishline guide portion 303' is larger in width that the other bail support arm, the weight of the former arm and the balancer 306 provided therein at the butt of the arm counteracts that of the bail 303 to prevent the weight of the assembly of the rotor 301 and the other reel components thereon from being biased toward the tip of the arm. The rotative balance of the rotor 301 at the time of winding of a fishline on the reel is thus improved to smoothly perform the winding. Besides, the recess 305 of the arm 302 provides a space in which an urging means and an inversion means for the bail 303 can be accommodated.

Figure 33:
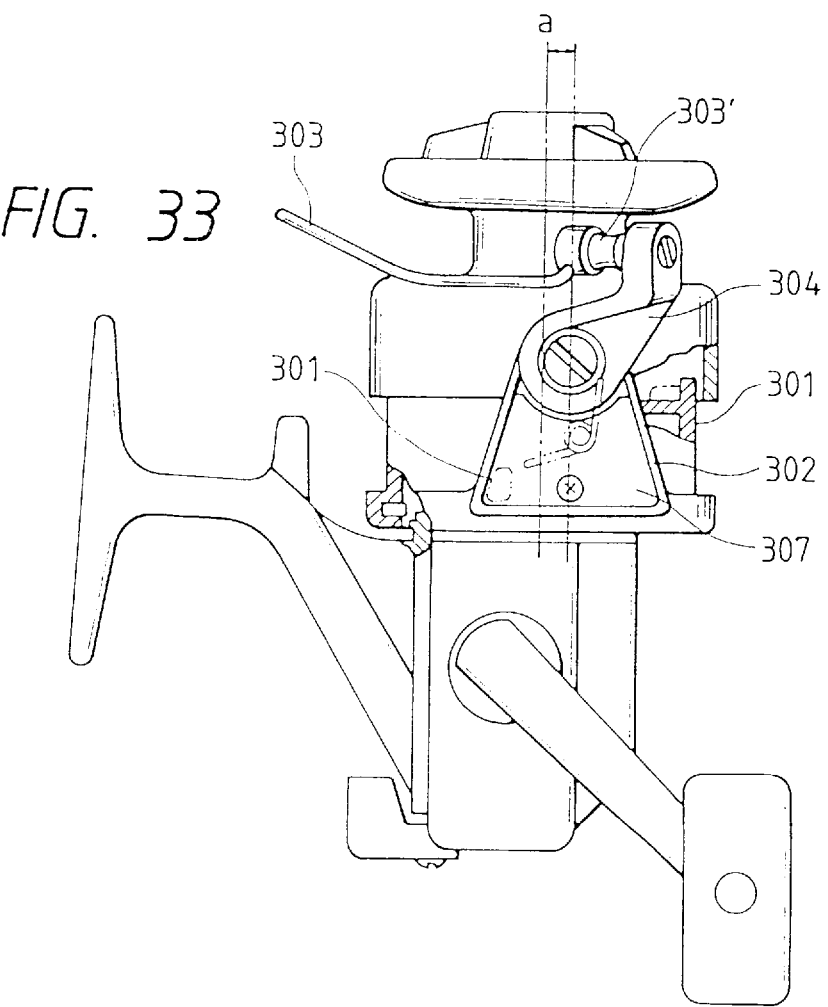
FIG. 33 is a cutaway side view of a spinning reel which is yet another modification of the embodiment shown in FIG. 25.
Figure 34:
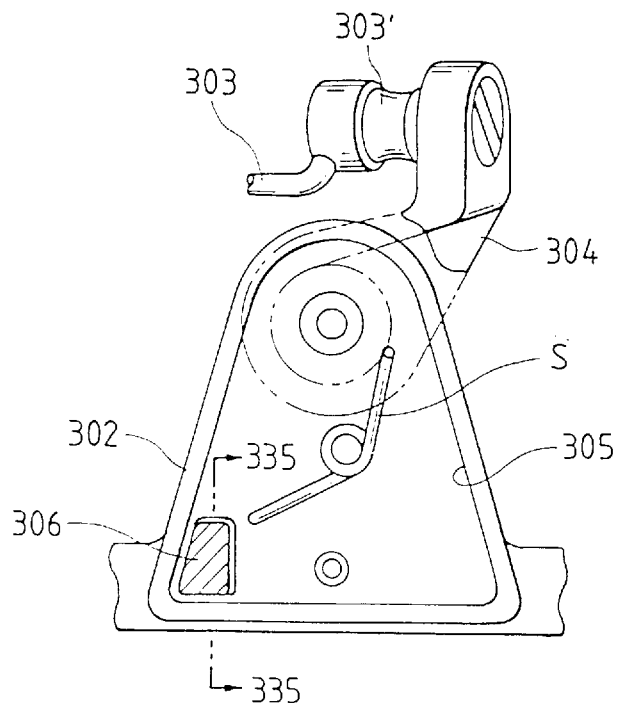
FIG. 34 is a side view of a major part of the reel in the state that a cover is removed.
Figure 35:
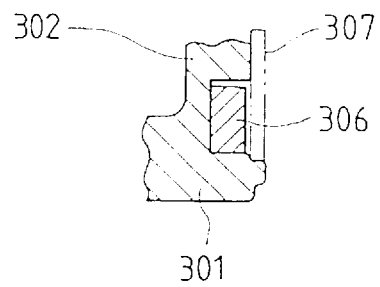
FIG. 35 is a sectional view of the part along line 35—35 shown in FIG. 34.
Figure 36:
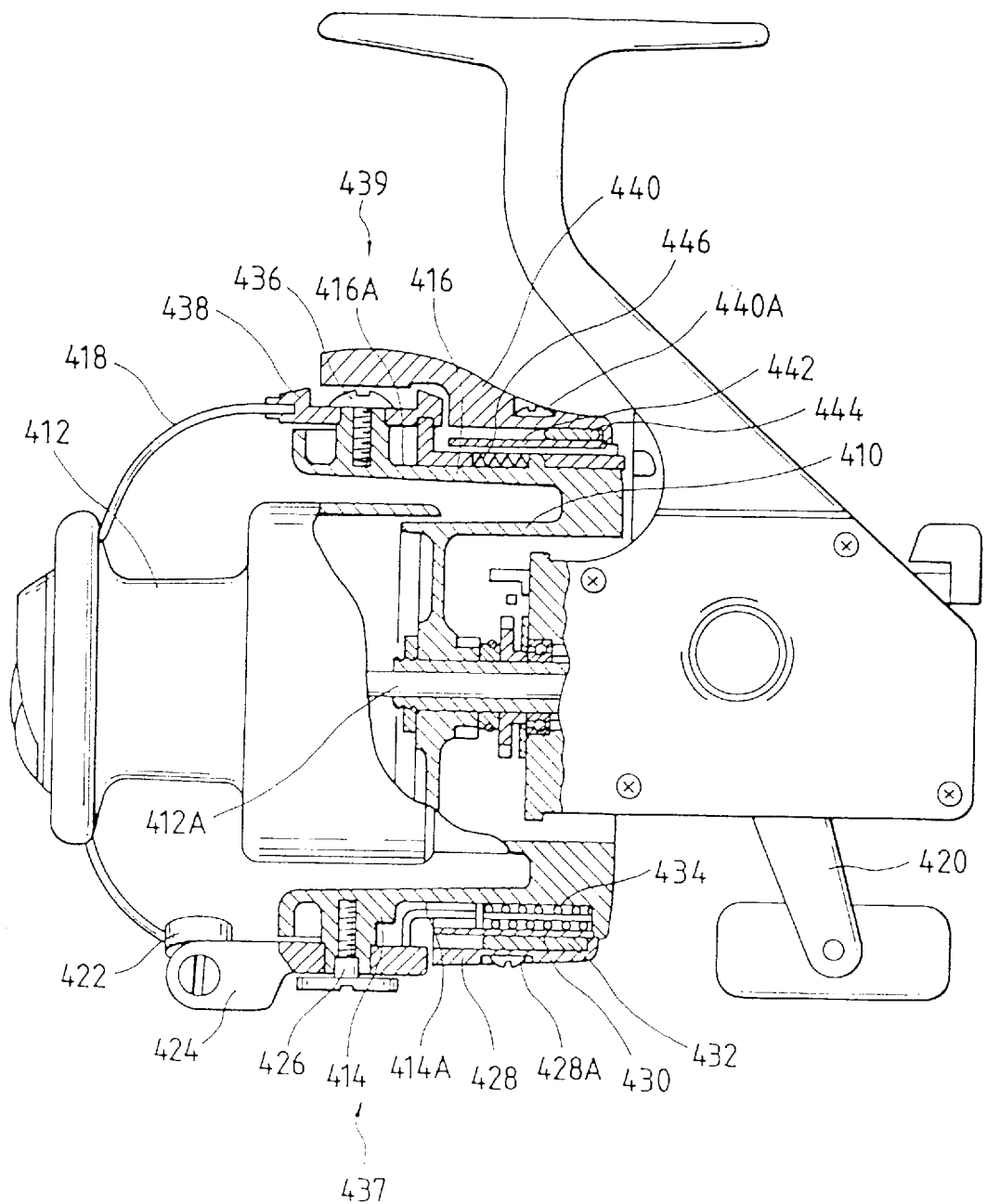
FIG. 36 is a cutaway side view of a spinning reel which is a yet another embodiment of the present invention.
Figure 37:
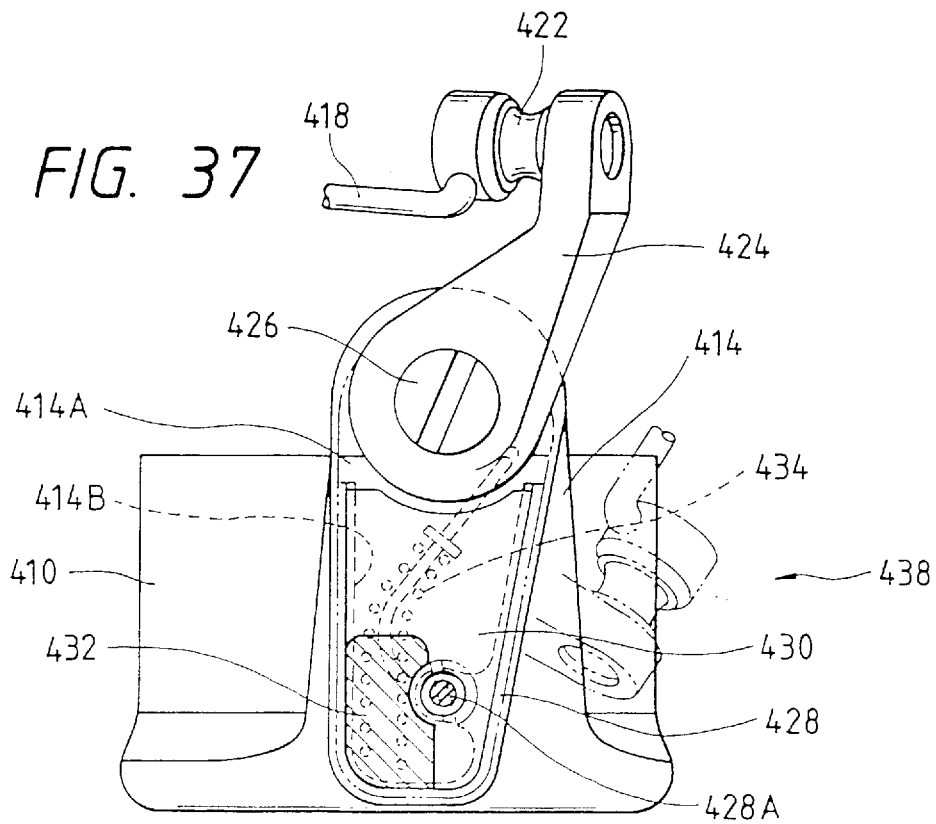
FIG. 37 is a cutaway side view of a major part of the reel seen along an arrow 37 shown in FIG. 36.
Figure 38:
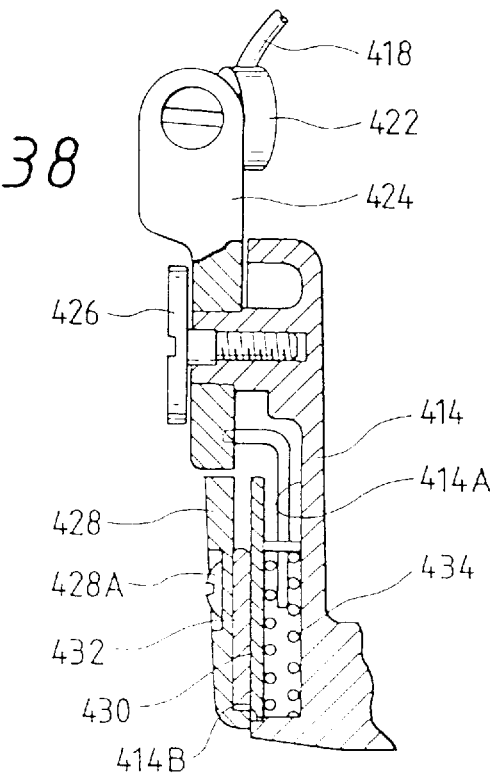
FIG. 38 is a cutaway side view of the part seen along an arrow 28 shown in FIG. 37.
Figure 39:
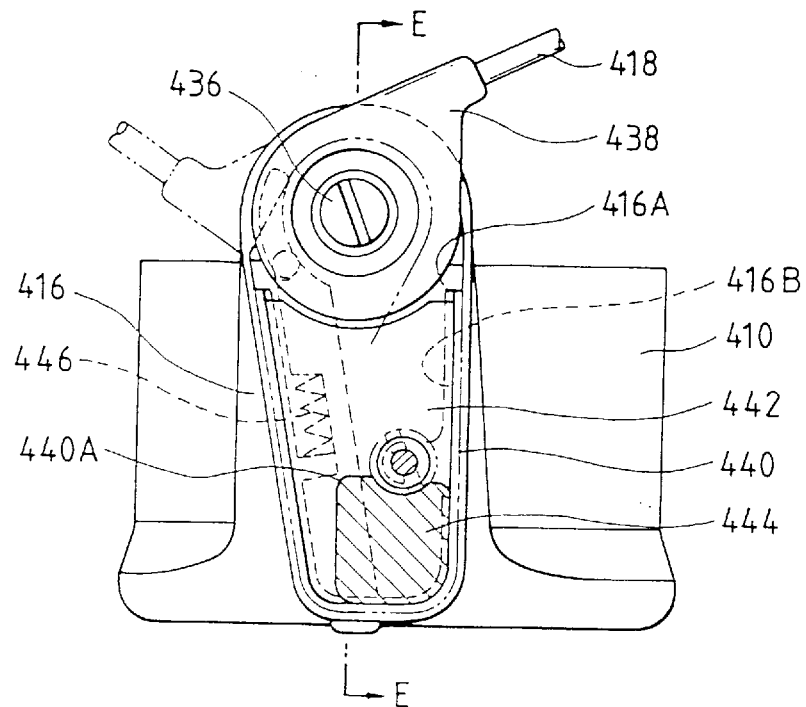
FIG. 39 is a cutaway side view of the part seen along an arrow 39 shown in FIG. 36.
Figure 40:
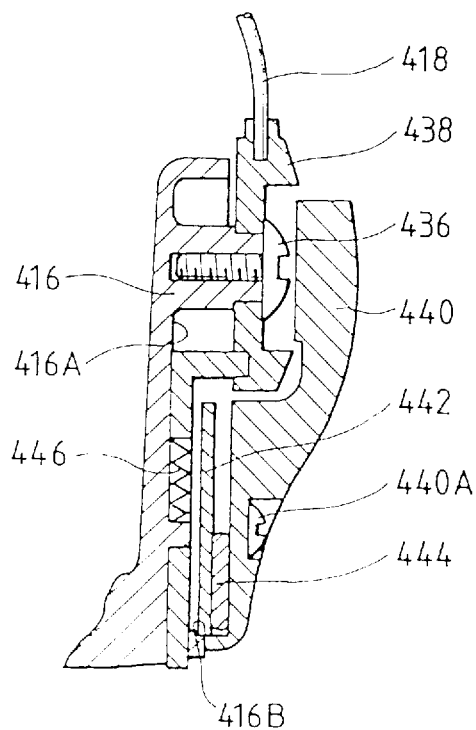
FIG. 40 is a longitudinally sectional view of the part along line 40—40 shown in FIG. 39.

FIGS. 33, 34 and 35 show a spinning reel which is yet another modification of the embodiment. The difference of the reel from the embodiment is that the axes of the pivotally coupled portions of bail support members 304 and 304', which are pivotally coupled to support arms 302, extend off the axis a of a rotor 301 and at the side of a bail 303 in the fishline unwinding position thereof, and a balancer 306 is provided in the arm of larger width than the other arm and located at the butt of the former arm at the side of the bail in the fishline winding position thereof. For that reason, the rotative balance of the rotor 301 is not only improved, but also the bail support member 304 and 304' serve to stabilize the balance and the weight of the balancer 306 is reduced.

A spinning reel provided in accordance with the present invention includes a support arm whose width is increased from the tip of the arm toward the butt thereof, and a balancer disposed in the arm at the butt thereof to prevent the weight of the assembly of a rotor and other reel components thereon from being biased toward the tip of the arm due to the weight of the fishline guide portion and the bail. For that reason, the rotative balance of the rotor at the time of winding of a fishline on the reel can be improved in a simple and easy manner to smoothly perform the winding. Besides, an urging means and an inversion means for the bail can be easily disposed in the wide recess of the support arm. The rotative balance of the rotor can be easily improved without adversely affecting the means. The axes of the pivotally coupled portions of bail support members, which are pivotally coupled to the support arms, may be located off the axis of the rotor and at the side of the bail in the fishline unwinding position thereof to improve the rotative balance of the rotor to more stabilize the balance and reduce the weight of the balancer.

FIGS. 36 to 40 show a spinning reel which is for fishing and is yet another embodiment of the invention.

When the handle 420 is turned, the rotor 410 is rotated and the spool 412 is reciprocated backward and forward so that a fishline is wound on the spool while being guided by the fishline guide roller 422. The support arms 414 and 416 are provided on the rotor 410, and located opposite each other across the axis of the rotor. The bail support member 424 is coupled to the front portion of the support arm 414 by the screw 426 so as to be swingable about the screw. The fishline guide roller 422 is attached to the bail support member 424 at the tip thereof. Another bail support member 438 is coupled to the front portion of the other support arm 416 by the screw 436 so that the member can be swung about the screw. The bail 418 is attached at both the ends thereof to the fishline guide roller 422 and the bail support member 438.

The support arm 414 for the bail support member 424 has a recess 414A in which the spring means 434 for urging the bail 418 to invert it into either of a fishline winding position and a fishline unwinding position is provided. The other support arm 416 has a recess 416A in which the inversion means 446 for inverting the bail 418 from the fishline unwinding position into the fishline winding position is provided. The outer plates 428 and 440 are fastened to the support arms 414 and 416 by screws 428A and 440A, and close the recesses 414A and 416A, respectively. The inner plates 430 and 442 are fastened to the arms 414 and 416 along the outer plates 428 and 440 so that the inner plates divide the spaces of the recesses 414A and 416A into layers piled together in the directions of thickness of the recesses. The inner plates 430 and 442 are engaged on the steps 414B and 416B of the arms 414 and 416, and fastened thereto together with the outer plates 428 and 440 by the screws 428A and 440A. The inner plates 430 and 442 may be otherwise secured to the steps 414B and 416B by an adhesive. The spring means 434 and the inversion means 446 are located inside the inner plates 430 and 442, respectively.

Without the plate-like balancers 432 and 444, the portion of the spinning reel at the support arm 414 and that of the reel at the other support arm 416 would differ from each other in distribution of weight so as to cause the centers of gravity of the portions to differ from each other in location along the axis of the rotor 410 to hinder it from being smoothly rotated. To avoid such hindrance, the balancers 432 and 444 are provided in the support arms 414 and 416 to shift the centers of gravity of the portions rearward and prevent the rotation of the rotor 410 from being unsmoothly rotated due to the imbalance of the centrifugal forces of the portions. The balancers 432 and 444 are located in the layers between the outer and the inner plates 428, 430, 440 and 442. The rotative balance of the rotor 410 is thus improved. Since the plates 428, 430, 440 and 442 and the plate-like balancers 432 and 444 are provided in the support arms 414 and 416, the arms can be made compact.

Although the support arms 414 and 416 are provided with the outer and the inner plates 428, 430, 440 and 442 and the balancers 432 and 444 in the embodiment, the present device is not confined thereto but may be otherwise constructed so that both of the arms are fitted with the outer plates but only one of the arms is fitted with the inner plate and the balancer, or that both of the arms are fitted with the outer and the inner plates but only one of the arms is fitted with the balancer.

Figure 41:
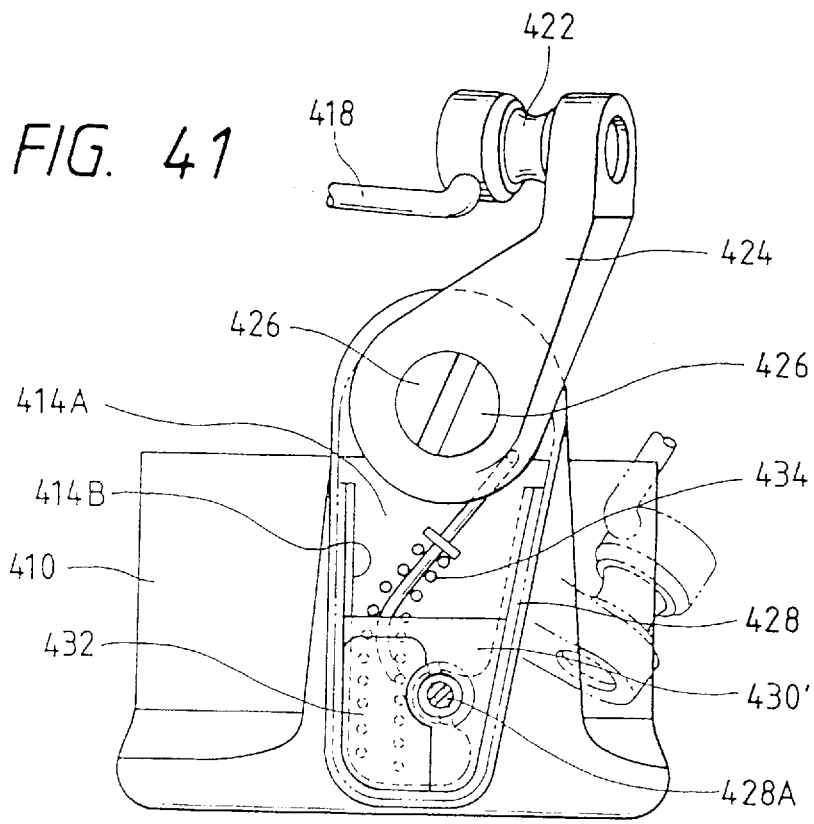
FIG. 41 is a cutaway side view of a major part of a spinning reel which is a modification of the embodiment shown in FIG. 36.

FIG. 41 shows a major part of a spinning reel which is a modification of the embodiment. The difference of the reel from the embodiment is that the length of the inner plate 430' of the reel is equal to nearly a half of that of the inner plate 430 of the preceding reel.

Figure 42:
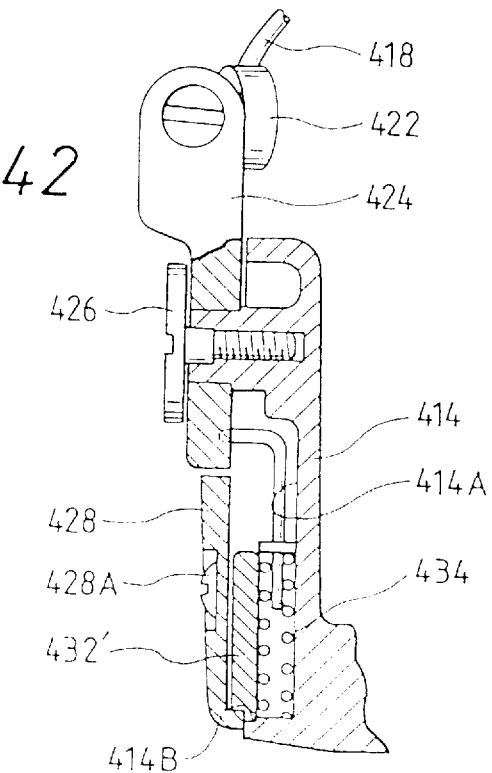
FIG. 42 is a cutaway side view of a major part of a spinning reel which is yet another modification of the embodiment shown in FIG. 36.

FIG. 42 shows a major part of a spinning reel which is another modification of the embodiment. The difference of the reel from the embodiment is that the reel includes a plate-like balancer 432' which also serves as an inner plate.

A spinning reel provided in accordance with the present device includes support arms having recesses whose spaces are divided into layers piled together in the directions of thickness of the recesses so that mechanical means and plate-like balancers are separately disposed in the layers. For that reason, the rotative balance of a rotor can be not only improved but also the support arms can be made compact. Since the balancers are completely separated from the mechanical means, it is easy to replace the balancers with other balancers of different weight in order to modulate the rotative balance of the rotor.

What is claimed is:

1. A spinning reel for fishing, comprising:

a bail which can be inverted into either of a fishline winding position and a fishline unwinding position;

a pair of first and second bail support members supporting said bail thereon, said first bail support member having a fishline guide; and a rotor defining a first axis around which said rotor is rotatable and having a pair of first and second support arms located opposite to each other across said first axis, said first and second support arms supporting said first and second bail support members, respectively, so as to permit said first and second bail support members to pivot around a second axis, said rotor further defining with respect to said first axis a fishline winding side to which said bail in said fishline winding position belongs and a fishline unwinding side to which said bail in said fishline unwinding position belongs, and wherein:

said second axis is off-set from said first axis in a direction away from said fishline winding side toward said fishline unwinding side; and first and second balancers for improving rotative balance of said rotor are respectively provided in said first and second support arms, said first and second balancers being located in said fishline winding side.

2. The spinning reel according to claim 1, wherein said first and second support arms extend from said rotor, respective proximal ends of said first and second support arms having a recess at a respective corner of each of said support arms for accommodating said balancer therein.

3. The spinning reel according to claim 1, wherein a cover is provided for closing an opening of said first support arm.

4. The spinning reel according to claim 1, wherein each of said first and second support arms extends from said rotor in a direction inclined relative to said first axis.

5. The spinning reel according to claim 1, wherein said first support arm houses both said first balancer and a bail inverting mechanism which inverts said bail from said fishline unwinding position to said fishline winding position.

6. The spinning reel according to claim 5, wherein said bail inverting mechanism comprises a lever which translates in a direction parallel to said first axis to cause said bail to pivot from said fishline unwinding position to said fishline winding position.

7. The spinning reel according to claim 6, wherein said lever comprises a leg portion extending toward said first axis, said leg portion engaging a stationary cam member formed on a housing of said reel during rotation of said rotor, wherein translation of said lever is caused by engagement of said leg portion with said cam member.

8. A spinning reel for fishing, comprising:

a rotor defining a first axis around which said rotor is rotatable;

first and second support arms located opposite to each other with respect to said first axis;

first and second bail support members pivotally supported respectively on said first and second support arms, said first bail support member having a fishline guide;

a bail supported on said bail support members to pivot about said rotor between a fishline winding position and a fishline unwinding position;

wherein said rotor further defines with respect to said first axis a fishline winding side when said bail is in said fishline winding position and a fishline unwinding side when said bail is in said fishline unwinding position;

and wherein said first and second support arms comprise a base portion projecting from said rotor, and a terminal portion proximate said bail support members, a majority of said base portion being located on said fishline winding side and a majority of said terminal portion being located on said fishline unwinding side in such a manner that the support arms extend obliquely with respect to said first axis from said fishline winding side to said fishline unwinding side; and wherein first and second balancers are respectively provided in said base portion of said first and second support arms for improving rotative balance of said rotor.

9. The spinning reel for fishing according to claim 8, wherein each of said support arms is substantially in the form of a parallelogram.

10. The spinning reel for fishing according to claim 8, wherein said second balancer is provided in said second support arm for minimizing a rotative imbalance due to a weight difference caused by components adjacent said first support arm.

11. The spinning reel for fishing according to claim 8, wherein said second balancer is greater in weight than said first balancer.

12. The spinning reel for fishing according to claim 8, further comprising an auxiliary balancer positioned radially inside said first and second support arms, and on said fishline unwinding side.

13. The spinning reel for fishing according to claim 8, wherein said first and second bail support members pivot about a second axis, said second axis being transverse to and offset from said first axis in a direction toward said fishline unwinding side.

14. The spinning reel for fishing according to claim 8, wherein a weight of said second support member is greater than a weight of said first support member for minimizing a rotative imbalance due to a weight difference caused by components adjacent said first support member.

15. The spinning reel for fishing according to claim 8, wherein a mechanism for returning said bail from said fishline unwinding position to said fishline winding position is provided within said first support arm.

16. The spinning reel according to claim 8, wherein said first support arm houses both said first balancer and a bail inverting mechanism which inverts said bail from said fishline unwinding position to said fishline winding position.

17. The spinning reel according to claim 16, wherein said bail inverting mechanism comprises a lever which translates in a direction parallel to said first axis to cause said bail to pivot from said fishline unwinding position to said fishline winding position.

18. The spinning reel according to claim 17, wherein said lever comprises a leg portion extending toward said first axis, said leg portion engaging a stationary cam member formed on a housing of said reel during rotation of said rotor, wherein translation of said lever is caused by engagement of said leg portion with said cam member.

19. A spinning reel for fishing, comprising:
   a rotor defining a first axis around which said rotor is rotatable;
   a pair of support arms, each integrally formed with and projecting from said rotor, said support arms generally positioned on opposite sides of said first axis; and
   a pair of bail support members supporting a bail and pivotally coupled to said support arms, respectively, wherein said bail is inverted into either of a fishline winding position and a fishline unwinding position, said rotor further defining with respect to said first axis a fishline winding side when said bail is located in said fishline winding position and a fishline unwinding side when said bail is located in said fishline unwinding position; and wherein a plane passing through said first axis divides each of said support arms into a first part belonging to said fishline winding side and a second part belonging to said fishline unwinding side, said first part of each support arm being respectively fitted with first and second balancers for correcting a center of gravity of said rotor rearwardly such that a weight of said first part is greater than a weight of said second part so as to counterbalance a weight of said bail.

20. The spinning reel for fishing according to claim 19, wherein each of said support arms is substantially in the form of a parallelogram.

21. The spinning reel for fishing according to claim 19, further comprising an auxiliary balancer positioned radially inside said support arms, and on said fishline unwinding side.

22. The spinning reel for fishing according to claim 19, wherein said support members pivot about a second axis, said second axis being transverse to and offset from said first axis in a direction toward said fishline unwinding side.

23. The spinning reel for fishing according to claim 19, wherein a weight of one of said support members is greater than a weight of the other of said support members for minimizing a rotative imbalance due to a weight difference caused by components adjacent the other of said support members.

24. The spinning reel for fishing according to claim 19, wherein a mechanism for returning said bail from said fishline unwinding position to said fishline winding position is provided within one of said support arms.

25. A spinning reel for fishing, comprising:
   a spool shaft defining a first rotational axis;
   a rotor rotatably supported on said spool shaft for rotation about said first rotational axis,
      said rotor comprising a base portion, a cylindrical portion integrally formed with and projecting from said base portion along said first rotational axis, and a pair of support arms integrally formed with and projecting from said rotor, said support arms generally positioned on opposite sides of said cylindrical portion; and
   a pair of bail support members supporting a bail and pivotally coupled to said support arms, said bail being pivotable about a second pivot axis into either of a fishline winding position and a fishline unwinding position to thereby define a fishline winding side when said bail is located in said fishline winding position and a fishline unwinding side when said bail is located in said fishline unwinding position;
   wherein a plane passing through said first axis divides each of said support arms into a first part belonging to said fishline winding side and a second part belonging to said fishline unwinding side, said first part of each support arm being fitted with a discrete balancing weight for correcting a center of gravity of said rotor rearwardly such that a weight of said first part is greater than a weight of said second part so as to counterbalance a weight of said bail.

26. The spinning reel for fishing according to claim 25, wherein at least one of said support arms extend away from said base portion and obliquely with respect to said first rotational axis from said fishline winding side to said fishline unwinding side.

27. The spinning reel for fishing according to claim 25, wherein said second pivot axis is transverse to and offset from said first rotational axis in a direction toward said fishline unwinding side.

28. The spinning reel for fishing according to claim 25, wherein an inverting mechanism for returning said bail from said fishline unwinding position to said fishline winding position is disposed within at least one of said support arms.

29. The spinning reel for fishing according to claim 28, wherein a weight of one of said support arms is greater than a weight of the other of said support members for minimizing a rotative imbalance due to a weight difference caused by said inverting mechanism.

30. The spinning reel for fishing according to claim 28, wherein said inverting mechanism comprises a spring and a lever member.

31. The spinning reel for fishing according to claim 30, wherein said spring and lever member are provided within only one of said support arms.

32. The spinning reel for fishing according to claim 30, wherein said spring is provided within one of said pair of support arms and said lever member is provided within the other of said pair of support arms.

33. The spinning reel for fishing according to claim 28, wherein said inverting mechanism comprises a lever which translates in a direction parallel to said first axis to cause said bail to pivot from said fishline unwinding position to said fishline winding position.

34. The spinning reel for fishing according to claim 33, wherein said lever comprises a leg portion extending toward said first axis, said leg portion engaging a stationary cam member formed on a housing of said reel during rotation of said rotor, wherein translation of said lever is caused by engagement of said leg portion with said cam member.

35. The spinning reel for fishing according to claim 25, wherein said balancing weight is removably disposed in said first part.

36. The spinning reel for fishing according to claim 25, wherein said balancing weight extends across said plane, and wherein a center of gravity of said balancing weight is locate within said first part.

37. The spinning reel for fishing according to claim 25, further comprising an auxiliary balancer positioned radially inside said pair of support arms, and on said fishline unwinding side.

38. The spinning reel for fishing according to claim 25, further comprising an auxiliary balancer positioned radially inside said pair of support arms and on said fishline winding side.

39. The spinning reel for fishing according to claim 25, wherein each of said support arms comprises a first wall on said fishline winding side and a second wall on said fishline unwinding side, said first and second walls defining a width of each of said support arms.

40. The spinning reel for fishing according to claim 39, wherein said width varies in a direction of said first rotational axis.

41. The spinning reel for fishing according to claim 39, wherein said first wall extends in a generally oblique direction with respect to said first rotational axis.

42. The spinning reel for fishing according to claim 39, wherein said first wall extends in a generally parallel direction with respect to said first rotational axis.

43. The spinning reel for fishing according to claim 39, wherein said second wall extends in a generally parallel direction with respect to said first rotational axis.

44. The spinning reel for fishing according to claim 39, wherein said second wall extends in a generally oblique direction with respect to said first rotational axis.

45. A spinning reel for fishing, comprising:

a bail which can be inverted into either of a fishline winding position and a fishline unwinding position;

a pair of first and second bail support members supporting said bail thereon, said first bail support member having a fishline guide; and a rotor defining a first axis around which said rotor is rotatable and having a pair of first and second support arms located opposite to each other across said first axis, said first and second support arms supporting said first and second bail support members, respectively, so as to permit said first and second bail support members to pivot around a second axis, said rotor further defining with respect to said first axis a fishline winding side to which said bail in said fishline winding position belongs and a fishline unwinding side to which said bail in said fishline unwinding position belongs, and wherein:

said second axis is off-set from said first axis in a direction away from said fishline winding side toward said fishline unwinding side; and first and second balancers for improving rotative balance of said rotor are respectively provided in said first and second support arms, said first and second balancers having centers of gravity located on said fishline winding side.

* * * * *